US012706686B2

(12) United States Patent
Yao et al.

(10) Patent No.: US 12,706,686 B2
(45) Date of Patent: Aug. 11, 2026

(54) METHOD AND APPARATUS FOR TRANSMITTING MODULATION AND CODING SCHEME MCS INDICATION INFORMATION AND COMMUNICATION DEVICE

(71) Applicant: VIVO MOBILE COMMUNICATION CO., LTD., Chang'an Dongguan (CN)

(72) Inventors: Jian Yao, Chang'an Dongguan (CN); Xiaodong Sun, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 573 days.

(21) Appl. No.: 18/304,280

(22) Filed: Apr. 20, 2023

(65) Prior Publication Data

US 2023/0344549 A1 Oct. 26, 2023

Related U.S. Application Data

(63) Continuation of application No. PCT/CN2021/124930, filed on Oct. 20, 2021.

(30) Foreign Application Priority Data

Oct. 22, 2020 (CN) ......................... 202011140865.X

(51) Int. Cl.
*H04L 1/00* (2006.01)

(52) U.S. Cl.
CPC .......... *H04L 1/0003* (2013.01); *H04L 1/0026* (2013.01)

(58) Field of Classification Search
None
See application file for complete search history.

(56) References Cited

U.S. PATENT DOCUMENTS 11,336,354 B2 5/2022 Park et al.
2015/0200746 A1 7/2015 Pan et al.
(Continued)

FOREIGN PATENT DOCUMENTS

CN 103580788 A 2/2014
CN 106559171 A 4/2017
(Continued)

OTHER PUBLICATIONS

3GPP TSG-RAN WG1 Meeting #90bis Prague, CZ, Oct. 9-13, 2017 [online], [retrieved by PCT/KR2018/014088] on Retrieved from the Internet [retrieved on Feb. 27, 2019] (Year: 2017).*
(Continued)

*Primary Examiner* — Sudesh M. Patidar
*Assistant Examiner* — Justin Michael Whitaker
(74) *Attorney, Agent, or Firm* — Foley & Lardner LLP

(57) ABSTRACT

A method and apparatus for transmitting MCS indication information and a communication device, and pertains to the field of communication technologies are provided. In a case that the method for transmitting MCS indication information is performed by a first communication device, the method includes: in a case that a second communication device is capable of supporting 1024QAM, transmitting first indication information, second indication information, and third indication information to the second communication device.

20 Claims, 4 Drawing Sheets

In a case that a second communication device is capable of supporting 1024 quadrature amplitude modulation (Quadrature Amplitude Modulation, QAM), transmit first indication information, second indication information, and third indication information to the second communication device

201

(56) References Cited

U.S. PATENT DOCUMENTS

| | | | | |
|---|---|---|---|---|
| 2016/0087752 | A1 | 3/2016 | Xia et al. | |
| 2018/0351625 | A1 | 12/2018 | Xu et al. | |
| 2020/0106550 | A1 | 4/2020 | Yoshimoto et al. | |
| 2020/0204289 | A1 | 6/2020 | Yoshimoto et al. | |
| 2020/0412431 | A1* | 12/2020 | Park | H04B 7/0469 |
| 2021/0029513 | A1* | 1/2021 | Rico Alvarino | H04W 72/121 |

FOREIGN PATENT DOCUMENTS

| | | | |
|---|---|---|---|
| CN | 110771202 | A | 2/2020 |
| EP | 3462654 | A1 | 4/2019 |
| WO | 2018230967 | A1 | 12/2018 |
| WO | 2019019174 | A1 | 1/2019 |

OTHER PUBLICATIONS

3GPP TSG RAN WG1 Meeting 90bis Prague, CZ, Oct. 9-13, 2017 [online], [retrieved by EPO on Oct. 9, 2017]. Retrieved from the Internet <URL: http://www.3gpp.org/ftp/Meetings_3GPP_SYNCH/RAN1/Docs> [retrieved on Oct. 8, 2017] (Year: 2017).*

3GPP TSG-RAN WG1 Meeting #91 Reno, USA, Dec. 1-27, 2017 [online], [retrieved by IDS] on Retrieved from the Internet [retrieved on May 10, 2024] (Year: 2017).*

3GPP TSG RAN WG1 Meeting #89 Hangzhou, China May 5-19, 2017 [online], [Retrieved from IDS]. [retrieved on May 10, 2024] ( Year: 2017).*

Intel Corporation, "On 1024QAM Support," 3GPP TSG RAN WG1 Meeting 90bis, R1-1717337, Prague, CZ, Oct. 9-13, 2017, 5 pages.

Huawei, Hisilicon, "Discussion on Support of DL 1024QAM," 3GPP TSG RAN WG1 Meeting #89, RQ-1707011, Hangzhou, China May 15-19, 2017, 3 pages.

ZTE, Sanechips "Discussion on CQI and MCW Table," 3GPP TSG-RAN WG1 Meeting #91, R1-1719731, Reno, Nevada, USA, Nov. 27-Dec. 1, 2017, 7 pages.

Intel Corporation., "On 1024QAM support," 3GPP TSG RAN WG1 Meeting 91, R1-1720038, pp. 1-7, (Nov. 27-Dec. 1, 2017).

International Search Report and Written Opinion of the International Searching Authority dated Dec. 22, 2021 as received In Application No. PCT/CN2021/124930.

* cited by examiner

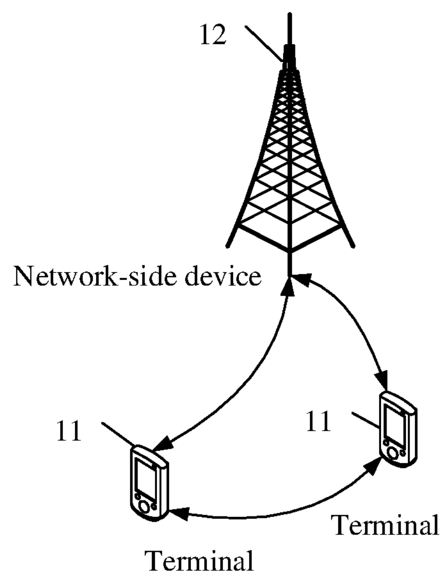
FIG. 1
In a case that a second communication device is capable of supporting 1024 quadrature amplitude modulation (Quadrature Amplitude Modulation, QAM), transmit first indication information, second indication information, and third indication information to the second communication device
201
FIG. 2
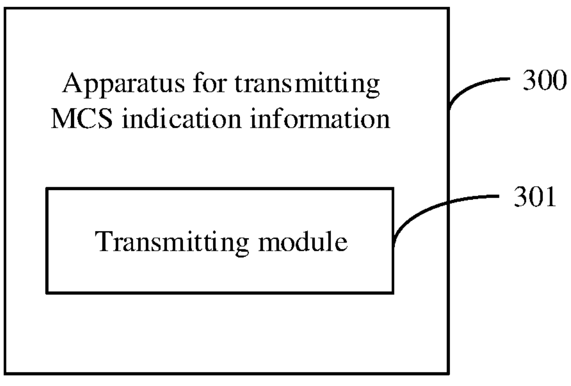
FIG. 3

METHOD AND APPARATUS FOR TRANSMITTING MODULATION AND CODING SCHEME MCS INDICATION INFORMATION AND COMMUNICATION DEVICE

CROSS-REFERENCE TO RELATED APPLICATIONS

This application is a continuation application of International Application No. PCT/CN2021/124930 filed on Oct. 20, 2021, which claims priority to Chinese Patent Application No. 202011140865.X, filed on Oct. 22, 2020 in China, which is incorporated herein by reference in its entirety.

TECHNICAL FIELD

This application pertains to the field of communication technologies, and specifically, relates to a method and apparatus for transmitting MCS indication information and a communication device.

BACKGROUND

At present, in communication systems (for example, new radio (NR) system), adaptive modulation and coding (AMC) technology is used for both downlink channel and uplink channel services. This technology is used to determine the modulation scheme and code rate according to channel conditions so as to improve spectral efficiency of the system. However, the NR system now supports 256QAM modulation as the highest-order scheme, leading to low data throughputs in high signal-to-noise ratio communication scenarios, affecting communication efficiency of the communication system.

SUMMARY

Embodiments of this application are intended to provide a method and apparatus for transmitting MCS indication information and a communication device, so as to increase data throughputs of a communication system in high signal-to-noise ratio communication scenarios.

According to a first aspect, a method for transmitting MCS indication information is provided, performed by a first communication device, including:

- in a case that a second communication device is capable of supporting 1024 quadrature amplitude modulation QAM, transmitting first indication information, second indication information, and third indication information to the second communication device; where
- the first indication information is used to indicate a modulation and coding scheme MCS table used for the second communication device to perform data transmission, and the MCS table includes an MCS level corresponding to a modulation scheme with a modulation order of 10;
- the second indication information is used to indicate a CQI table used for the second communication device to perform channel quality indicator CQI feedback, and the CQI table includes a CQI level corresponding to the 1024QAM modulation scheme; and
- the third indication information is used for determining, according to the MCS table, an MCS level corresponding to a channel received or transmitted by the second communication device.

According to a second aspect, a method for transmitting MCS indication information is provided, performed by a second communication device, including:

- in a case that the second communication device is capable of supporting 1024 quadrature amplitude modulation QAM, receiving first indication information, second indication information, and third indication information that are transmitted by a first communication device; where
- the first indication information is used to indicate a modulation and coding scheme MCS table used for the second communication device to perform data transmission, and the MCS table includes an MCS level corresponding to a modulation scheme with a modulation order of 10;
- the second indication information is used to indicate a CQI table used for the second communication device to perform channel quality indicator CQI feedback, and the CQI table includes a CQI level corresponding to the 1024QAM modulation scheme; and
- the third indication information is used for determining, according to the MCS table, an MCS level corresponding to a channel received or transmitted by the second communication device.

According to a third aspect, an apparatus for transmitting MCS indication information is provided, including:

- a transmitting module configured to, in a case that a second communication device is capable of supporting 1024 quadrature amplitude modulation QAM, transmit first indication information, second indication information, and third indication information to the second communication device; where
- the first indication information is used to indicate a modulation and coding scheme MCS table used for the second communication device to perform data transmission, and the MCS table includes an MCS level corresponding to a modulation scheme with a modulation order of 10;
- the second indication information is used to indicate a CQI table used for the second communication device to perform channel quality indicator CQI feedback, and the CQI table includes a CQI level corresponding to the 1024QAM modulation scheme; and
- the third indication information is used for determining, according to the MCS table, an MCS level corresponding to a channel received or transmitted by the second communication device.

According to a fourth aspect, an apparatus for transmitting MCS indication information is provided, including:

- a receiving module configured to, in a case that the apparatus for transmitting MCS indication information is capable of supporting 1024 quadrature amplitude modulation QAM, receive first indication information, second indication information, and third indication information that are transmitted by a first communication device; where
- the first indication information is used to indicate a modulation and coding scheme MCS table used for the apparatus for transmitting MCS indication information to perform data transmission, and the MCS table includes an MCS level corresponding to a modulation scheme with a modulation order of 10;
- the second indication information is used to indicate a CQI table used for the apparatus for transmitting MCS indication information to perform channel quality indicator CQI feedback, and the CQI table includes a CQI level corresponding to the 1024QAM modulation scheme; and the third indication information is used for determining, according to the MCS table, an MCS level corresponding to a channel received or transmitted by the apparatus for transmitting MCS indication information.

According to a fifth aspect, a communication device is provided, where the communication device includes a processor, a memory, and a program or instructions stored in the memory and capable of running on the processor, and when the program or instructions are executed by the processor, the steps of the method for transmitting MCS indication information according to the first aspect are implemented, or the steps of the method for transmitting MCS indication information according to the second aspect are implemented.

According to a sixth aspect, a readable storage medium is provided, where the readable storage medium stores a program or instructions, and when the program or instructions are executed by a processor, the steps of the method for transmitting MCS indication information according to the first aspect are implemented, or the steps of the method for transmitting MCS indication information according to the second aspect are implemented.

According to a seventh aspect, a chip is provided. The chip includes a processor and a communication interface, where the communication interface is coupled to the processor, and the processor is configured to run a program or instructions of a network-side device to implement the method for transmitting MCS indication information according to the first aspect or the method for transmitting MCS indication information according to the second aspect.

According to an eighth aspect, a computer program product is provided, where the computer program product is stored in a non-volatile storage medium, and the computer program product is executed by at least one processor to implement the method for transmitting MCS indication information according to the first aspect or the method for transmitting MCS indication information according to the second aspect.

In the embodiments of this application, the MCS table indicated by the first indication information includes at least an MCS level corresponding to the modulation scheme with a modulation order of 10, making it possible that the MCS level determined by the third indication information is an MCS level corresponding to the modulation scheme with a modulation order of 10. The second communication device is capable of supporting 1024QAM, and therefore can use a modulation scheme and code rate corresponding to a modulation order of 10 for a channel scheduled by the second communication device. In this way, a communication system can support higher-order modulation, ensuring high data throughputs of the communication system in high signal-to-noise ratio communication scenarios, thus improving transmission efficiency of the communication system.

BRIEF DESCRIPTION OF DRAWINGS

FIG. 1 is a block diagram of a wireless communication system to which embodiments of this application are applicable;

FIG. 2 is a flowchart of a method for transmitting MCS indication information according to an embodiment of this application;

FIG. 3 is a structural diagram of an apparatus for transmitting MCS indication information according to an embodiment of this application;

DESCRIPTION OF EMBODIMENTS

Figure 4:
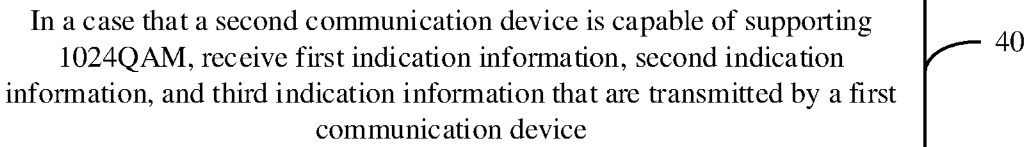
FIG. 4 is a flowchart of another method for transmitting MCS indication information according to an embodiment of this application.

The following clearly describes the technical solutions in the embodiments of this application with reference to the accompanying drawings in the embodiments of this application. Apparently, the described embodiments are only some but not all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that data used in this way is interchangeable in appropriate circumstances such that the embodiments of this application can be implemented in other orders than the order illustrated or described herein. In addition, objects distinguished by "first" and "second" are generally of a same type, and the object quantities are not limited, for example, there may be one or more first objects. In addition, in this specification and claims, "and/or" indicates at least one of connected objects, and the character "/" generally indicates an "or" relationship between associated objects.

It should be noted that the technologies described in the embodiments of this application are not limited to the long term evolution (LTE)/LTE-advanced (LTE-A) system, but may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technologies described herein may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than the NR system application, for example, the 6th generation (6G) communication system.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal-side device, such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes wrist band, earphones, glasses, or the like. It should be noted that the specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission-reception point (TRP), or other appropriate terms in the art. Provided that the same technical effects are achieved, the base station is not limited to any specific technical term. It should be noted that in the embodiments of this application, only the base station in the NR system is used as an example, but the specific type of the base station is not limited.

In addition, the communication system to which the embodiments of this application are applicable may alternatively be a sidelink communication system. For a specific implementation form of the sidelink communication system, reference may be made to the related art, which is not described herein.

The method and apparatus for transmitting modulation and coding scheme (MCS) indication information and the communication device provided in the embodiments of this application are described in detail below through specific embodiments and application scenarios thereof with reference to the accompanying drawings.

Refer to FIG. 2. FIG. 2 is a flowchart of a method for transmitting MCS indication information according to an embodiment of this application. The method provided in this embodiment of this application is applied to a first communication device, and the first communication device may be a network-side device, a terminal in a sidelink communication system, or the like.

As shown in FIG. 2, the method for transmitting MCS indication information includes the following step.

Step 201. In a case that a second communication device is capable of supporting 1024 quadrature amplitude modulation (QAM), transmit first indication information, second indication information, and third indication information to the second communication device.

The first indication information is used to indicate an MCS table used for the second communication device to perform data transmission, where the MCS table includes an MCS level corresponding to a modulation scheme with a modulation order of 10; the second indication information is used to indicate a CQI table used for the second communication device to perform channel quality indicator (CQI) feedback, where the CQI table includes a CQI level corresponding to the 1024QAM modulation scheme; and the third indication information is used for determining, according to the MCS table, an MCS level corresponding to a channel received or transmitted by the second communication device.

Optionally, the first indication information and the second indication information are transmitted via higher layer signaling, and the third indication information is transmitted via indication information in downlink control information (DCI).

For example, the first communication device is a network-side device, and the second communication device is a terminal. The network-side device may transmit first indication information to the terminal via higher layer signaling, to indicate an MCS table used for the terminal to perform data transmission. The first indication information may be at least one of the following: parameters in higher layer signaling PUSCH-Config, parameters in higher layer signaling ConfiguredGrantConfig, parameters in higher layer signaling PDSCH-Config, and parameters in higher layer signaling SPS-Config. The network-side device may also transmit second indication information to the terminal via the higher layer signaling, to indicate a CQI table used for the terminal to perform CQI feedback. The second indication information may be parameters in higher layer signaling CSI-ReportConfig.

It should be noted that the MCS table includes MCS index, modulation order, target code rate, and spectral efficiency. As shown in Table 1, each MCS index is uniquely corresponding to each MCS level, where MCS index being 0 indicates a first MCS level, MCS index being 1 indicates a second MCS level, and so on.

TABLE 1

MCS table 1

| MCS index $I_{MCS}$ | Modulation order $Q_m$ | Target code rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

The first communication device may notify the second communication device of the determined MCS level via third indication information of 5 bits in the downlink control information (DCI), and the second communication device learns, according to the MCS level indicated by the third indication information received via physical downlink control channel (PDCCH), an MCS level used for the first communication device to perform transmission on physical downlink shared channel (PDSCH), and can determine, based on a correspondence in the MCS table indicated by the first indication information, a modulation order and a code rate that correspond to the indicated MCS level so as to demodulate and decode corresponding data in the PDSCH.

In this embodiment of this application, the MCS table further includes MCS table 2 shown in Table 2 and MCS table 3 shown in Table 3.

TABLE 2

| MCS table 2 | | | |
|---|---|---|---|
| MCS index $I_{MCS}$ | Modulation order $Q_m$ | Target code rate R × [1024] | Spectral efficiency |
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 3

| MCS table 3 | | | |
|---|---|---|---|
| MCS index $I_{MCS}$ | Modulation order $Q_m$ | Target code rate R × [1024] | Spectral efficiency |
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |

TABLE 3-continued

| MCS table 3 | | | |
|---|---|---|---|
| MCS index $I_{MCS}$ | Modulation order $Q_m$ | Target code rate R × [1024] | Spectral efficiency |
| 28 | 6 | 772 | 4.5234 |
| 29 | 2 | reserved | |
| 30 | 4 | reserved | |
| 31 | 6 | reserved | |

It should be noted that the second communication device needs to measure the downlink channel so as to report a CQI to the first communication device. The CQI feedback may be transmission of a modulation scheme and code rate recommended via physical uplink shared channel (PUSCH) or physical uplink control channel (PUCCH). The first communication device determines, according to the CQI reported by the second communication device and a prediction algorithm, an MCS corresponding to the uplink or downlink channel. In the NR system, the modulation scheme and code rate are quantized to fifteen CQI levels which are defined in a form of a 4-bit table, that is, a CQI table. CQI tables 1-3 shown in the following correspond to the foregoing MCS tables 1-3 respectively, and CQI tables 1-3 define modulation schemes, code rates, and spectral efficiencies corresponding to different CQI levels. CQI index being 0 indicates a first CQI level, CQI index being 1 indicates a second CQI level, and so on.

TABLE 4

| CQI table 1 | | | |
|---|---|---|---|
| CQI index | Modulation | Code rate × 1024 | Efficiency |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 5

| CQI table 2 | | | |
|---|---|---|---|
| CQI index | Modulation | Code rate x 1024 | Efficiency |
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 490 | 1.9141 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |
| 10 | 64 QAM | 772 | 4.5234 |
| 11 | 64 QAM | 873 | 5.1152 |
| 12 | 256 QAM | 711 | 5.5547 |
| 13 | 256 QAM | 797 | 6.2266 |

TABLE 5-continued

| CQI table 2 | | | |
|---|---|---|---|
| CQI index | Modulation | Code rate x 1024 | Efficiency |
| 14 | 256 QAM | 885 | 6.9141 |
| 15 | 256 QAM | 948 | 7.4063 |

TABLE 6

| CQI table 3 | | | |
|---|---|---|---|
| CQI index | Modulation | Code rate x 1024 | Efficiency |
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16 QAM | 378 | 1.4766 |
| 10 | 16 QAM | 490 | 1.9141 |
| 11 | 16 QAM | 616 | 2.4063 |
| 12 | 64 QAM | 466 | 2.7305 |
| 13 | 64 QAM | 567 | 3.3223 |
| 14 | 64 QAM | 666 | 3.9023 |
| 15 | 64 QAM | 772 | 4.5234 |

In this embodiment of this application, in a case that the second communication device is capable of supporting 1024QAM, the first communication device transmits the first indication information to the second communication device, where the first indication information is used to indicate the MCS table used for the second communication device to perform data transmission. After the first communication device determines the MCS level according to the MCS table, the first communication device notifies, via the third indication information, the second communication device of the MCS level corresponding to the channel received or transmitted by the second communication device, so as to indicate that the second communication device determines, according to the MCS level, the modulation scheme and code rate used for the channel received or transmitted by the second communication device.

The MCS table provided in this embodiment of this application includes at least an MCS level corresponding to the modulation scheme with a modulation order of 10, making it possible that the MCS level determined by the third indication information is an MCS level corresponding to the modulation scheme with a modulation order of 10. The second communication device is capable of supporting 1024QAM, and therefore can use a modulation scheme and code rate corresponding to a modulation order of 10 for a channel scheduled by the second communication device. In this way, the communication system can support higher-order modulation, ensuring high data throughputs of the communication system in high signal-to-noise ratio communication scenarios, thus improving transmission efficiency of the communication system.

In this embodiment of this application, the MCS table including an MCS level corresponding to the modulation scheme with a modulation order of 10 may be designed based on the CQI table. Optionally, the CQI table includes a CQI level corresponding to 1024QAM, and the CQI table satisfies at least one of the following conditions:

the CQI table includes CQI levels corresponding to 256QAM in a first CQI table, where the first CQI table is a CQI table (namely, Table 5 shown above) including CQI levels corresponding to 256QAM;

spectral efficiencies corresponding to CQI levels are at equal intervals;

code rates corresponding to CQI levels are at equal intervals;

signal-to-noise ratios corresponding to CQI levels are at equal intervals; and the spectral efficiency is rounded to four decimal places; and the CQI table also satisfies any one of the following:

in a case that a decimal fraction is present in the code rate, the code rate is determined by rounding up to the nearest integer;

in a case that a decimal fraction is present in the code rate, the code rate is determined by rounding down to the nearest integer;

in a case that a decimal fraction is present in the code rate, the code rate is determined by rounding to the nearest integer; and in a case that a decimal fraction is present in the code rate, the code rate is rounded to one decimal place.

It should be noted that, to be better distinguished from the foregoing CQI tables 1-3, in the following description of this embodiment of this application, the CQI table including CQI levels corresponding to 1024QAM is referred to as a first target CQI table, so the first target CQI table naturally satisfies at least one of the foregoing conditions.

The first target CQI table includes the CQI levels corresponding to 256QAM in the first CQI table (namely, Table 5, CQI table 2), that is, the first target CQI table may be designed based on the foregoing CQI table 2.

In this embodiment of this application, the CQI table includes at least two CQI levels corresponding to the 1024QAM modulation scheme. To be specific, the first target CQI table includes at least two CQI levels corresponding to the 1024QAM modulation scheme, for example, a first CQI level and a second CQI level, or may further include a third CQI level and a fourth CQI level on the basis of the first CQI level and the second CQI level.

Optionally, in an implementation, the first target CQI table includes a first CQIlevel and a second CQI level that correspond to the 1024QAM modulation scheme, where code rate corresponding to the first CQI level is different from code rate corresponding to the second CQI level and spectral efficiency corresponding to the first CQI level is different from spectral efficiency corresponding to the second CQI level.

In addition, it should be noted that the first target CQI table is designed based on the foregoing CQI table 2, and the CQI levels corresponding to 256QAM in the CQI table 2 are retained in the first target CQI table. The first CQI level and the second CQI level that correspond to the 1024QAM modulation scheme need to be added, and thus two CQI levels in the CQI table 2 may be deleted accordingly. Optionally, the deleting may be performed in a preset order of deletion of QPSK, 16QAM, and 64QAM. For example, CQI levels corresponding to QPSK are preferentially deleted, and then CQI levels corresponding to 16QAM and 64QAM are deleted. Certainly, the CQI levels in the CQI table 2 may be selectively deleted according to other rules. In an optional implementation of this embodiment of this application, a CQI level corresponding to CQI index 5 and a CQI level corresponding to CQI index 7 in the CQI table 2 are deleted, and the first CQI level and the second CQI level that correspond to the 1024QAM modulation scheme are added.

In the first target CQI table, code rates and spectral efficiencies corresponding to the first CQI level and the second CQI level may be determined based on at least one of the foregoing conditions. For example, spectral efficiencies corresponding to CQI levels in the first target CQI table are at equal intervals, so based on the determined spectral efficiencies corresponding to the CQI levels in the CQI table 2, the spectral efficiencies respectively corresponding to the first CQI level and the second CQI level can be determined. The spectral efficiencies corresponding to the first CQI level and the second CQI level are rounded to four decimal places. For another example, code rates corresponding to CQI levels in the first target CQI table are at equal intervals, so based on determined code rates corresponding to the CQI levels in the CQI table 2, the code rates respectively corresponding to the first CQI level and the second CQI level can be determined. The code rates in the first target CQI table may also satisfy: in a case that a decimal fraction is present in the code rate, the code rate may be determined by rounding up, rounding down, or rounding to the nearest integer, or the code rate is rounded to one decimal place. For example, the code rate corresponding to the first CQI level may be an integer or rounded to one decimal place, or the code rate corresponding to the first CQI level may correspond to a plurality of values.

Optionally, the code rate and the spectral efficiency corresponding to the first CQI level may be determined based on the foregoing conditions. For example, the code rate corresponding to the first CQI level is 853, and the spectral efficiency corresponding to the first CQI level is 8.3321.

Optionally, the code rate and the spectral efficiency corresponding to the second CQI level may also be determined based on the foregoing conditions. For example, the code rate corresponding to the second CQI level is 948, and the spectral efficiency corresponding to the second CQI level is 9.2578.

In this way, the first target CQI table being CQI table 4 shown in Table 7 below can be obtained.

TABLE 7

| CQI table 4 | | | |
|---|---|---|---|
| CQI index | Modulation | Code rate x 1024 | Efficiency |
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 616 | 2.4063 |
| 6 | 64 QAM | 567 | 3.3223 |
| 7 | 64 QAM | 666 | 3.9023 |
| 8 | 64 QAM | 772 | 4.5234 |
| 9 | 64 QAM | 873 | 5.1152 |
| 10 | 256 QAM | 711 | 5.5547 |
| 11 | 256 QAM | 797 | 6.2266 |
| 12 | 256 QAM | 885 | 6.9141 |
| 13 | 256 QAM | 948 | 7.4063 |
| 14 | 1024 QAM | 853 | 8.3321 |
| 15 | 1024 QAM | 948 | 9.2578 |

In the foregoing CQI table 4, the first CQI level and the second CQI level that correspond to the 1024QAM modulation scheme correspond to CQI index 14 and CQI index 15 respectively. In this way, in addition to the foregoing CQI tables 1-3, the second indication information transmitted by the first communication device to the second communication device can also indicate the CQI table 4, so the CQI table used for the second communication device to perform channel quality indicator feedback can include the CQI levels corresponding to the 1024QAM modulation scheme, facilitating higher-order modulation of the communication system.

In this embodiment of this application, the CQI table includes at least two CQI levels corresponding to the 1024QAM modulation scheme, and on the basis of the foregoing CQI table 4 including the first CQI level and the second CQI level, the CQI table further includes a third CQI level and a fourth CQI level that correspond to the 1024QAM modulation scheme, where the third CQI level and the fourth CQI level are obtained based on the first CQI level and the second CQI level.

In other words, based on the foregoing CQI table 4, the third CQI level and the fourth CQI level that correspond to the 1024QAM modulation scheme can be further added, and the first CQI level and the second CQI level in the CQI table 4 are retained. To better describe this implementation, the CQI table including the first CQI level, the second CQI level, the third CQI level, and the fourth CQI level is defined as a second target CQI table, and the second target CQI table also satisfies at least one of the following conditions:

the CQI table includes CQI levels corresponding to 256QAM in a first CQI table, where the first CQI table is a CQI table (namely, Table 5 shown above) including CQI levels corresponding to 256QAM;

spectral efficiencies corresponding to CQI levels are at equal intervals;

code rates corresponding to CQI levels are at equal intervals;

signal-to-noise ratios corresponding to CQI levels are at equal intervals; and the spectral efficiency is rounded to four decimal places; and the CQI table also satisfies any one of the following:

in a case that a decimal fraction is present in the code rate, the code rate is determined by rounding up to the nearest integer;

in a case that a decimal fraction is present in the code rate, the code rate is determined by rounding down to the nearest integer;

in a case that a decimal fraction is present in the code rate, the code rate is determined by rounding to the nearest integer; and in a case that a decimal fraction is present in the code rate, the code rate is rounded to one decimal place.

It can be understood that the second target CQI table is designed based on the foregoing CQI table 4. The third CQIlevel and the fourth CQI level that correspond to the 1024QAM modulation scheme are added, and thus two CQI levels in the CQI table 4 may be deleted accordingly, with the CQIlevels corresponding to the 1024QAM and 256QAM modulation schemes retained. Code rates and spectral efficiencies corresponding to the third CQI level and the fourth CQI level may be determined based on at least one of the foregoing conditions. For example, spectral efficiencies corresponding to CQI levels in the second target CQI table are at equal intervals, so based on the determined spectral efficiencies corresponding to the CQI levels in the foregoing CQI table 4, the spectral efficiencies corresponding to the third CQI level and the fourth CQI level can be determined. The spectral efficiencies corresponding to the third CQI level and the fourth CQIlevel are rounded to four decimal places. In addition, the code rates corresponding to the third CQI level, the fourth CQIlevel, and other CQI levels are at equal intervals. In a case that a decimal fraction is present in the code rate, the code rate may be determined by rounding up, rounding down, or rounding to the nearest integer, or the code rate is rounded to one decimal place. For example, the code rate corresponding to the third CQI level may be corresponding to a plurality of values, and the code rate corresponding to the fourth CQI level may also be corresponding to a plurality of values.

Optionally, the third CQI level may be obtained by interpolating the first CQI level and the second CQI level. For example, the spectral efficiencies corresponding to the first CQI level, the second CQI level, and the third CQI level are at equal intervals, and the spectral efficiencies corresponding to the first CQI level and the second CQI level are known, so the spectral efficiency corresponding to the third CQI level can be determined. The fourth CQI level may also be obtained by interpolating the first CQI level and the second CQI level.

The code rate corresponding to the third CQI level is any one of the following: 805, 806, and 805.5, and the spectral efficiency corresponding to the third CQI level is any one of the following: 7.8613, 7.8711, and 7.8662.

The code rate corresponding to the fourth CQI level is any one of the following: 900, 901, and 900.5, and the spectral efficiency corresponding to the fourth CQI level is any one of the following: 8.7891, 8.7988, and 8.7939.

Specifically, the second target CQI table being CQI tables 5-8 shown in Tables 8-11 below can be obtained.

TABLE 8

| CQI table 5 | | | |
|---|---|---|---|
| CQI index | Modulation | Code rate x 1024 | Efficiency |
| 0 | | out of range | |
| 1 | QPSK | 78 | 0.1523 |
| 2 | QPSK | 193 | 0.377 |
| 3 | QPSK | 449 | 0.877 |
| 4 | 16 QAM | 378 | 1.4766 |
| 5 | 16 QAM | 616 | 2.4063 |
| 6 | 64 QAM | 567 | 3.3223 |
| 7 | 64 QAM | 772 | 4.5234 |
| 8 | 256 QAM | 711 | 5.5547 |
| 9 | 256 QAM | 797 | 6.2266 |
| 10 | 256 QAM | 885 | 6.9141 |
| 11 | 256 QAM | 948 | 7.4063 |
| 12 | 1024 QAM | 805 | 7.8613 |
| 13 | 1024 QAM | 853 | 8.3301 |
| 14 | 1024 QAM | 900 | 8.7891 |
| 15 | 1024 QAM | 948 | 9.2578 |

TABLE 9

| CQI table 6 | | | |
|---|---|---|---|
| CQI index | Modulation | Code rate x 1024 | Efficiency |
| 0 | | out of range | |
| 1 | QPSK | 78 | 0.1523 |
| 2 | QPSK | 193 | 0.377 |
| 3 | QPSK | 449 | 0.877 |
| 4 | 16 QAM | 378 | 1.4766 |
| 5 | 16 QAM | 616 | 2.4063 |
| 6 | 64 QAM | 567 | 3.3223 |
| 7 | 64 QAM | 772 | 4.5234 |
| 8 | 256 QAM | 711 | 5.5547 |
| 9 | 256 QAM | 797 | 6.2266 |
| 10 | 256 QAM | 885 | 6.9141 |
| 11 | 256 QAM | 948 | 7.4063 |
| 12 | 1024 QAM | 806 | 7.8711 |
| 13 | 1024 QAM | 853 | 8.3301 |
| 14 | 1024 QAM | 901 | 8.7988 |
| 15 | 1024 QAM | 948 | 9.2578 |

TABLE 10

| CQI table 7 | | | |
|---|---|---|---|
| CQI index | Modulation | Code rate x 1024 | Efficiency |
| 0 | | out of range | |
| 1 | QPSK | 78 | 0.1523 |
| 2 | QPSK | 193 | 0.377 |
| 3 | QPSK | 449 | 0.877 |
| 4 | 16 QAM | 378 | 1.4766 |
| 5 | 16 QAM | 616 | 2.4063 |
| 6 | 64 QAM | 567 | 3.3223 |
| 7 | 64 QAM | 772 | 4.5234 |
| 8 | 256 QAM | 711 | 5.5547 |
| 9 | 256 QAM | 797 | 6.2266 |
| 10 | 256 QAM | 885 | 6.9141 |
| 11 | 256 QAM | 948 | 7.4063 |
| 12 | 1024 QAM | 805.5 | 7.8662 |
| 13 | 1024 QAM | 853 | 8.3301 |
| 14 | 1024 QAM | 900.5 | 8.7939 |
| 15 | 1024 QAM | 948 | 9.2578 |

TABLE 11

| CQI table 8 | | | |
|---|---|---|---|
| CQI index | Modulation | Code rate x 1024 | Efficiency |
| 0 | | out of range | |
| 1 | QPSK | 78 | 0.1523 |
| 2 | QPSK | 193 | 0.377 |
| 3 | QPSK | 449 | 0.877 |
| 4 | 16 QAM | 378 | 1.4766 |
| 5 | 16 QAM | 616 | 2.4063 |
| 6 | 64 QAM | 567 | 3.3223 |
| 7 | 64 QAM | 772 | 4.5234 |
| 8 | 256 QAM | 711 | 5.5547 |
| 9 | 256 QAM | 797 | 6.2266 |
| 10 | 256 QAM | 885 | 6.9141 |
| 11 | 256 QAM | 948 | 7.4063 |
| 12 | 1024 QAM | 806 | 7.8711 |
| 13 | 1024 QAM | 853 | 8.3301 |
| 14 | 1024 QAM | 900.5 | 8.7939 |
| 15 | 1024 QAM | 948 | 9.2578 |

In the foregoing CQI tables 5-8, the first CQI level, the second CQI level, the third CQI level, and the fourth CQI level that correspond to the 1024QAM modulation scheme correspond to CQI index 13, CQI index 15, CQI index 12, and CQI index 14 respectively. In this way, the CQI table, indicated by the first communication device, used for the second communication device to perform channel quality indicator feedback includes the CQI tables 1-8, and thus can include more CQI levels corresponding to the 1024QAM modulation scheme. This further enhances the second communication device's flexibility and selectivity in terms of channel quality indicator feedback, providing a greater advantage in aiding the communication system's higher-order modulation, thus increasing data throughputs of the communication system in high signal-to-noise ratio scenarios.

Optionally, the CQI table may be configured by radio resource control (RRC) signaling.

In this embodiment of this application, the MCS table includes at least the MCS level corresponding to the modulation scheme with a modulation order of 10, and the MCS table may be designed based on the foregoing CQI tables. Optionally, the MCS table satisfies at least one of the following:

the MCS table includes code rates and spectral efficiencies in the CQI table;

the MCS table includes MCS levels corresponding to 256QAM in a first MCS table, where the first MCS table is an MCS table including MCS levels corresponding to 256QAM;

spectral efficiencies corresponding to MCS levels are at equal intervals;

target code rates corresponding to MCS levels are at equal intervals;

signal-to-noise ratios corresponding to MCS levels are at equal intervals; and the spectral efficiency is rounded to four decimal places; and the MCS table also satisfies any one of the following:

in a case that a decimal fraction is present in the target code rate, the target code rate is determined by rounding up to the nearest integer;

in a case that a decimal fraction is present in the target code rate, the target code rate is determined by rounding down to the nearest integer;

in a case that a decimal fraction is present in the target code rate, the target code rate is determined by rounding to the nearest integer; and in a case that a decimal fraction is present in the target code rate, the target code rate is rounded to one decimal place.

It should be noted that, to be better distinguished from the foregoing MCS tables 1-3, in the following description of this embodiment of this application, the MCS table including the MCS level corresponding to the modulation scheme with a modulation order of 10 is referred to as a first target MCS table, so the first target MCS table naturally satisfies at least one of the foregoing conditions.

The first target MCS table includes a first MCS level, a second MCS level, a third MCS level, a fourth MCS level, and a fifth MCS level that is for retransmission, where the MCS levels correspond to the modulation scheme with a modulation order of 10.

It should be noted that, the first target MCS table includes corresponding target code rates and spectral efficiencies in the CQI tables, and the CQI tables are the foregoing CQI tables including the 1024QAM modulation scheme, namely, the foregoing CQI tables 4-8. In this way, the first target MCS table includes the target code rates and the spectral efficiencies corresponding to the CQI levels in the foregoing CQI tables 4-8, and thus the first target MCS table includes target code rates and spectral efficiencies corresponding to the 1024QAM modulation scheme. For example, the first target MCS table may be designed based on the foregoing CQI table 4 so as to add MCS levels corresponding to the modulation scheme with a modulation order of 10. Alternatively, the first target MCS table includes the MCS levels corresponding to 256QAM in the first MCS table, where the first MCS table is an MCS table including MCS levels corresponding to 256QAM, meaning that the first MCS table is the foregoing MCS table 2 and the first target MCS table is designed based on the MCS table 2 to include additional MCS levels corresponding to the modulation scheme with a modulation order of 10.

In an implementation of this embodiment of this application, the first target MCS table may be designed based on the MCS table 2, the first MCS level, the second MCS level, the third MCS level, the fourth MCS level, and the fifth MCS level are added, and thus five MCS levels in the original MCS table are deleted accordingly. Optionally, an MCS level corresponding to a modulation order of 2 may be preferentially deleted, followed by an MCS level corresponding to a modulation order of 4 and then an MCS level corresponding to a modulation order of 6, or the MCS levels in the MCS table 2 may be selectively deleted according to other rules. Optionally, in this embodiment of this application, MCS levels corresponding to MCS indexes 6, 8, 10, 12, and 14 in the MCS table 2 are deleted, and the MCS levels corresponding to the modulation scheme with a modulation order of 10 are added, namely, the first MCS level, the second MCS level, the third MCS level, the fourth MCS level, and the fifth MCS level that is for retransmission, so as to obtain the first target MCS table.

In the first target MCS table, target code rates and spectral efficiencies corresponding to the first MCS level, the second MCS level, the third MCS level, and the fourth MCS level may be determined based on at least one of the conditions satisfied by the MCS table. For example, spectral efficiencies corresponding to MCS levels in the first target MCS table are at equal intervals, so based on the determined spectral efficiencies corresponding to the MCS levels in the MCS table 2, the spectral efficiencies corresponding to the four added MCS levels can be determined. Further, the spectral efficiencies corresponding to the first MCS level, the second MCS level, the third MCS level, and the fourth MCS level may be rounded to four decimal places. For another example, target code rates corresponding to the MCS levels in the first target MCS table are at equal intervals, so based on the determined target code rates corresponding to the MCS levels in the MCS table 2, the target code rates corresponding to the four added MCS levels can be determined. Further, the target code rates corresponding to the first MCS level, the second MCS level, the third MCS level, and the fourth MCS level may also satisfy: in a case that a decimal fraction is present in the target code rate, the target code rate may be determined by rounding up, rounding down, or rounding to the nearest integer, or the target code rate is rounded to one decimal place. For example, the target code rate corresponding to the first MCS level may be an integer or rounded to one decimal place, or the target code rate corresponding to the first MCS level may correspond to a plurality of values.

Optionally, the target code rate and the spectral efficiency corresponding to the first MCS level may be determined based on the foregoing conditions. For example, the target code rate corresponding to the first MCS level is any one of the following: 805, 806, and 805.5, and the spectral efficiency corresponding to the first MCS level is any one of the following: 7.8613, 7.8711, and 7.8662.

Optionally, the target code rate corresponding to the second MCS level is 853, and the spectral efficiency corresponding to the second MCS level is 8.3301.

Optionally, the target code rate corresponding to the third MCS level is any one of the following: 900, 901, and 900.5, and the spectral efficiency corresponding to the third MCS level is any one of the following: 8.7891, 8.7988, and 8.7939.

Optionally, the target code rate corresponding to the fourth MCS level is 948, and the spectral efficiency corresponding to the fourth MCS level is 9.2578.

Specifically, based on the foregoing optional implementation, the first target MCS table being MCS tables 4-7 shown in Tables 12-15 below can be obtained.

TABLE 12

MCS table 4

| MCS index $I_{MCS}$ | Modulation order $Q_m$ | Target code rate R x [1024] | Spectral efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.332 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3301 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 13

MCS table 5

| MCS index $I_{MCS}$ | Modulation order $Q_m$ | Target code rate R x [1024] | Spectral efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.332 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805 | 7.8613 |
| 24 | 10 | 853 | 8.3301 |
| 25 | 10 | 900 | 8.7891 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 14

MCS table 6

| MCS index $I_{MCS}$ | Modulation order $Q_m$ | Target code rate R x [1024] | Spectral efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.332 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 806 | 7.8711 |
| 24 | 10 | 853 | 8.3301 |
| 25 | 10 | 901 | 8.7988 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 15

MCS table 7

| MCS index $I_{MCS}$ | Modulation order $Q_m$ | Target code rate R x [1024] | Spectral efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.332 |
| 16 | 8 | 711 | 5.5547 |
| 17 | 8 | 754 | 5.8906 |

TABLE 15-continued

| MCS table 7 | | | |
|---|---|---|---|
| MCS index $I_{MCS}$ | Modulation order $Q_m$ | Target code rate R x [1024] | Spectral efficiency |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 806 | 7.8711 |
| 24 | 10 | 853 | 8.3301 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

In the foregoing MCS tables 4-7, the first MCS level, the second MCS level, the third MCS level, the fourth MCS level, and the fifth MCS level that correspond to the modulation scheme with a modulation order of 10 correspond to MCS index 23, MCS index 24, MCS index 25, MCS index 26, and MCS index 31 respectively. In this way, the MCS table, indicated by the first communication device, used for the second communication device to perform data transmission includes the MCS tables 1-7, so the channel received or transmitted by the second communication device can include the MCS levels corresponding to the modulation scheme with a modulation order of 10. This further increases the order of the modulation scheme for the communication device to receive or transmit channels, thus increasing data throughputs of the communication system in high signal-to-noise ratio scenarios.

It can be understood that the MCS table may be designed based on the CQI table. Further, in another implementation of this embodiment of this application, the second target MCS table can be correspondingly designed based on the foregoing CQI tables 5-8. It should be noted that the second target MCS table may be updated based on the first target MCS table, namely, the MCS tables 4-7.

Optionally, the MCS table further includes a sixth MCS level, a seventh MCS level, an eighth MCS level, and a ninth MCS level, where the MCS levels correspond to the modulation scheme with a modulation order of 10. In other words, the second target MCS table may additionally include the sixth MCS level, the seventh MCS level, the eighth MCS level, and the ninth MCS level based on the first target MCS table, so the second target MCS table includes nine MCS levels corresponding to the modulation scheme with a modulation order of 10, which are the first MCS level, the second MCS level, the third MCS level, the fourth MCS level, the fifth MCS level, the sixth MCS level, the seventh MCS level, the eighth MCS level, and the ninth MCS level respectively.

The second target MCS table may also satisfy at least one of the following conditions:

- the MCS table includes code rates and spectral efficiencies in the CQI table;
- the MCS table includes MCS levels corresponding to 256QAM in a first MCS table, where the first MCS table is an MCS table including MCS levels corresponding to 256QAM;
- spectral efficiencies corresponding to MCS levels are at equal intervals;
- target code rates corresponding to MCS levels are at equal intervals;
- signal-to-noise ratios corresponding to MCS levels are at equal intervals; and
- the spectral efficiency is rounded to four decimal places; and
- the MCS table also satisfies any one of the following:
- in a case that a decimal fraction is present in the target code rate, the target code rate is determined by rounding up to the nearest integer;
- in a case that a decimal fraction is present in the target code rate, the target code rate is determined by rounding down to the nearest integer;
- in a case that a decimal fraction is present in the target code rate, the target code rate is determined by rounding to the nearest integer; and
- in a case that a decimal fraction is present in the target code rate, the target code rate is rounded to one decimal place.

It can be understood that the second target MCS table is designed based on the foregoing first target MCS table and corresponds to the foregoing CQI tables 5-8, so the sixth MCS level, the seventh MCS level, the eighth MCS level, and the ninth MCS level can be added based on the first target MCS table, and four MCS levels in the first target MCS table are deleted accordingly. For the manner of deletion, reference may be made to the description of the foregoing first target MCS table, and details are not described herein again. Target code rates and spectral efficiencies corresponding to the sixth MCS level, seventh MCS level, eighth MCS level, and ninth MCS level added may be determined based on at least one of the foregoing conditions. The sixth MCS level is used as an example. The spectral efficiencies corresponding to the sixth MCS level and other MCS levels in the second target MCS table are at equal intervals, and the spectral efficiency corresponding to the sixth MCS level is rounded to four decimal places. The target code rates corresponding to the sixth MCS level and other MCS levels are at equal intervals, and in a case that a decimal fraction is present in the target code rate corresponding to the sixth MCS level, the target code rate corresponding to the sixth MCS level may be determined by rounding up, rounding down, or rounding to the nearest integer, or the target code rate is rounded to one decimal place.

Optionally, the target code rate corresponding to the sixth MCS level is any one of the following: 781, 783, 781.5, and 782, and the spectral efficiency corresponding to the sixth MCS level is any one of the following: 7.627, 7.6465, 7.6318, and 7.6367.

Optionally, the target code rate corresponding to the seventh MCS level is any one of the following: 828, 830, and 829.5, and the spectral efficiency corresponding to the seventh MCS level is any one of the following: 8.0859, 8.1055, and 8.1006.

Optionally, the target code rate corresponding to the eighth MCS level is any one of the following: 876, 877, and 876.5, and the spectral efficiency corresponding to the eighth MCS level is any one of the following: 8.5547, 8.5645, and 8.5596.

Optionally, the target code rate corresponding to the ninth MCS level is any one of the following: 924, 925, and 924.5, and the spectral efficiency corresponding to the ninth MCS level is any one of the following: 9.0234, 9.0332, and 9.0283.

Specifically, based on the foregoing optional implementation, the second target MCS table being MCS tables 8-11 shown in Tables 16-19 below can be obtained.

TABLE 16

MCS table 8

| MCS index $I_{MCS}$ | Modulation order $Q_m$ | Target code rate R x [1024] | Spectral efficiency |
|---|---|---|---|
| 0 | 2 | 120 | 0.2344 |
| 1 | 2 | 193 | 0.377 |
| 2 | 2 | 449 | 0.877 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 567 | 3.3223 |
| 8 | 6 | 666 | 3.9023 |
| 9 | 6 | 772 | 4.5234 |
| 10 | 6 | 873 | 5.1152 |
| 11 | 8 | 682.5 | 5.332 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 916.5 | 7.1602 |
| 18 | 8 | 948 | 7.4063 |
| 19 | 10 | 781 | 7.627 |
| 20 | 10 | 805 | 7.8613 |
| 21 | 10 | 828 | 8.0859 |
| 22 | 10 | 853 | 8.3301 |
| 23 | 10 | 876 | 8.5547 |
| 24 | 10 | 900 | 8.7891 |
| 25 | 10 | 924 | 9.0234 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 17

MCS table 9

| MCS index $I_{MCS}$ | Modulation order $Q_m$ | Target code rate R x [1024] | Spectral efficiency |
|---|---|---|---|
| 0 | 2 | 120 | 0.2344 |
| 1 | 2 | 193 | 0.377 |
| 2 | 2 | 449 | 0.877 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 567 | 3.3223 |
| 8 | 6 | 666 | 3.9023 |
| 9 | 6 | 772 | 4.5234 |
| 10 | 6 | 873 | 5.1152 |
| 11 | 8 | 682.5 | 5.332 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 916.5 | 7.1602 |
| 18 | 8 | 948 | 7.4063 |
| 19 | 10 | 783 | 7.6465 |
| 20 | 10 | 806 | 7.8711 |
| 21 | 10 | 830 | 8.1055 |
| 22 | 10 | 853 | 8.3301 |
| 23 | 10 | 877 | 8.5645 |
| 24 | 10 | 901 | 8.7988 |
| 25 | 10 | 925 | 9.0332 |
| 26 | 10 | 948 | 9.2578 |
| 27 | 2 | reserved | |

TABLE 17-continued

MCS table 9

| MCS index $I_{MCS}$ | Modulation order $Q_m$ | Target code rate R x [1024] | Spectral efficiency |
|---|---|---|---|
| 28 | 4 | reserved | |
| 29 | 6 | reserved | |
| 30 | 8 | reserved | |
| 31 | 10 | reserved | |

TABLE 18

MCS table 10

| MCS index $I_{MCS}$ | Modulation order $Q_m$ | Target code rate R x [1024] | Spectral efficiency |
|---|---|---|---|
| 0 | 2 | 120 | 0.2344 |
| 1 | 2 | 193 | 0.377 |
| 2 | 2 | 449 | 0.877 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 567 | 3.3223 |
| 8 | 6 | 666 | 3.9023 |
| 9 | 6 | 772 | 4.5234 |
| 10 | 6 | 873 | 5.1152 |
| 11 | 8 | 682.5 | 5.332 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 916.5 | 7.1602 |
| 18 | 8 | 948 | 7.4063 |
| 19 | 10 | 781.5 | 7.6318 |
| 20 | 10 | 805.5 | 7.8662 |
| 21 | 10 | 829.5 | 8.1006 |
| 22 | 10 | 853 | 8.3301 |
| 23 | 10 | 876.5 | 8.5596 |
| 24 | 10 | 900.5 | 8.7939 |
| 25 | 10 | 924.5 | 9.0283 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 19

MCS table 11

| MCS index $I_{MCS}$ | Modulation order $Q_m$ | Target code rate R x [1024] | Spectral efficiency |
|---|---|---|---|
| 0 | 2 | 120 | 0.2344 |
| 1 | 2 | 193 | 0.377 |
| 2 | 2 | 449 | 0.877 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 567 | 3.3223 |
| 8 | 6 | 666 | 3.9023 |
| 9 | 6 | 772 | 4.5234 |
| 10 | 6 | 873 | 5.1152 |
| 11 | 8 | 682.5 | 5.332 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 916.5 | 7.1602 |

TABLE 19-continued

MCS table 11

| MCS index $I_{MCS}$ | Modulation order $Q_m$ | Target code rate R x [1024] | Spectral efficiency |
|---|---|---|---|
| 18 | 8 | 948 | 7.4063 |
| 19 | 10 | 782 | 7.6367 |
| 20 | 10 | 806 | 7.8711 |
| 21 | 10 | 829.5 | 8.1006 |
| 22 | 10 | 853 | 8.3301 |
| 23 | 10 | 876.5 | 8.5596 |
| 24 | 10 | 900.5 | 8.7939 |
| 25 | 10 | 924.5 | 9.0283 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

In the foregoing MCS tables 8-11, the MCS levels corresponding to the modulation scheme with a modulation order of 10 correspond to MCS indexes 19-26 and MCS index 31 respectively. In this way, the MCS table, indicated by the first communication device, used for the second communication device to perform data transmission includes the MCS tables 1-11. This further increases the number of MCS tables, enhancing the second communication device's selectivity and flexibility in use of MCS levels for receiving or transmitting channels, and also effectively increases the order of the modulation scheme for the communication device to receive or transmit channels, increasing data throughputs of the communication system in high signal-to-noise ratio scenarios.

In this embodiment of this application, the MCS table applies to at least one of the following:

PDSCH scheduled by PDCCH of a first downlink control information format for which cyclic redundancy check (CRC) is scrambled by cell radio network temporary identifier (C-RNTI) or configured scheduling RNTI (CS-RNTI);

PDSCH scheduled by PDCCH of a second DCI format for which CRC is scrambled by C-RNTI or CS-RNTI; and physical uplink shared channel PUSCH scheduled by PDCCH of a third DCI format for which CRC is scrambled by C-RNTI or CS-RNTI, or grant-free PUSCH configured by RRC signaling.

In other words, the foregoing MCS tables including the MCS levels corresponding to the modulation scheme with a modulation order of 10, namely, the foregoing MCS tables 4-11, may apply to PDSCH scheduled by PDCCH of a DCI format 1_1 for which CRC is scrambled by C-RNTI or CS-RNTI; and/or apply to PDSCH scheduled by PDCCH of a DCI format 1_2 for which CRC is scrambled by C-RNTI or CS-RNTI; and/or apply to PUSCH scheduled by a DCI format 0_1 or 0_2 for which CRC is scrambled by C-RNTI or CS-RNTI, or apply to grant-free PUSCH configured by RRC signaling.

In this embodiment of this application, before step 201, the method may further include:

receiving fourth indication information reported by the second communication device, where the fourth indication information is used to indicate whether the second communication device is capable of supporting 1024QAM.

In other words, the first communication device first receives the fourth indication information reported by the second communication device, and in a case that the fourth indication information indicates that the second communication device is capable of supporting 1024QAM, the first communication device then sends the first indication information, the second indication information, and the third indication information to the second communication device. That is, the first communication device indicates the MCS table used for the second communication device to perform data transmission and the CQI table used for the second communication device to perform CQI feedback, and notifies the second communication device of the MCS level corresponding to the channel received or transmitted by the second communication device. The second communication device is capable of supporting 1024QAM, and therefore can use a modulation scheme and code rate corresponding to a modulation order of 10 for a channel scheduled by the second communication device. In this way, the communication system can support higher-order modulation, ensuring high data throughputs of the communication system in high signal-to-noise ratio communication scenarios, and improving the transmission efficiency of the communication system.

Optionally, the fourth indication information is reported with any one of the following granularities:

per band;

per band combination; and per feature set per component-carrier (FSPC).

For example, the second communication device may report the fourth indication information per band and/or combination of bands (band combination) or per FSPC to notify the first communication device of whether the second communication device is capable of supporting 1024QAM, such that the first communication device can determine the MCS level corresponding to the channel scheduled by the second communication device, facilitating smooth communication between the first communication device and the second communication device.

It should be noted that the method for transmitting MCS indication information provided in the embodiments of this application may be performed by an apparatus for transmitting MCS indication information, or a control module for performing the method for transmitting MCS indication information in the apparatus for transmitting MCS indication information. In the embodiments of this application, the method for transmitting MCS indication information being performed by the apparatus for transmitting MCS indication information is used as an example to describe the apparatus for transmitting MCS indication information provided in the embodiments of this application.

Refer to FIG. 3. FIG. 3 is a structural diagram of an apparatus for transmitting MCS indication information according to an embodiment of this application. As shown in FIG. 3, the apparatus 300 for transmitting MCS indication information includes:

a transmitting module 301 configured to, in a case that a second communication device is capable of supporting 1024 quadrature amplitude modulation QAM, transmit first indication information, second indication information, and third indication information to the second communication device; where the first indication information is used to indicate a modulation and coding scheme MCS table used for the second communication device to perform data transmission, and the MCS table includes an MCS level corresponding to a modulation scheme with a modulation order of 10;

the second indication information is used to indicate a CQI table used for the second communication device to perform channel quality indicator CQI feedback, and the CQI table includes a CQI level corresponding to the 1024QAM modulation scheme; and the third indication information is used for determining, according to the MCS table, an MCS level corresponding to a channel received or transmitted by the second communication device.

Optionally, the CQI table satisfies at least one of the following:

the CQI table includes CQI levels corresponding to 256QAM in a first CQI table, where the first CQI table is a CQI table including CQI levels corresponding to 256QAM;

spectral efficiencies corresponding to CQI levels are at equal intervals;

code rates corresponding to CQI levels are at equal intervals;

signal-to-noise ratios corresponding to CQI levels are at equal intervals; and the spectral efficiency is rounded to four decimal places; and the CQI table also satisfies any one of the following:

in a case that a decimal fraction is present in the code rate, the code rate is determined by rounding up to the nearest integer;

in a case that a decimal fraction is present in the code rate, the code rate is determined by rounding down to the nearest integer;

in a case that a decimal fraction is present in the code rate, the code rate is determined by rounding to the nearest integer; and in a case that a decimal fraction is present in the code rate, the code rate is rounded to one decimal place.

Optionally, the CQI table includes at least two CQI levels corresponding to the 1024QAM modulation scheme.

Optionally, the CQI table includes a first CQI level and a second CQI level that correspond to the 1024QAM modulation scheme, where code rate corresponding to the first CQI level is different from code rate corresponding to the second CQI level and spectral efficiency corresponding to the first CQI level is different from spectral efficiency corresponding to the second CQI level.

Optionally, the code rate corresponding to the first CQI level is 853, and the spectral efficiency corresponding to the first CQI level is 8.3321.

Optionally, the code rate corresponding to the second CQI level is 948, and the spectral efficiency corresponding to the second CQI level is 9.2578.

Optionally, the CQI table further includes a third CQI level and a fourth CQI level that correspond to the 1024QAM modulation scheme, where the third CQI level and the fourth CQI level are obtained based on the first CQI level and the second CQI level.

Optionally, code rate corresponding to the third CQI level is any one of the following: 805, 806, and 805.5, and spectral efficiency corresponding to the third CQI level is any one of the following: 7.8613, 7.8711, and 7.8662.

Optionally, code rate corresponding to the fourth CQI level is any one of the following: 900, 901, and 900.5, and spectral efficiency corresponding to the fourth CQI level is any one of the following: 8.7891, 8.7988, and 8.7939.

Optionally, the MCS table satisfies at least one of the following:

the MCS table includes code rates and spectral efficiencies in the CQI table;

the MCS table includes MCS levels corresponding to 256QAM in a first MCS table, where the first MCS table is an MCS table including MCS levels corresponding to 256QAM;

spectral efficiencies corresponding to MCS levels are at equal intervals;

target code rates corresponding to MCS levels are at equal intervals;

signal-to-noise ratios corresponding to MCS levels are at equal intervals; and the spectral efficiency is rounded to four decimal places; and the MCS table also satisfies any one of the following:

in a case that a decimal fraction is present in the target code rate, the target code rate is determined by rounding up to the nearest integer;

in a case that a decimal fraction is present in the target code rate, the target code rate is determined by rounding down to the nearest integer;

in a case that a decimal fraction is present in the target code rate, the target code rate is determined by rounding to the nearest integer; and in a case that a decimal fraction is present in the target code rate, the target code rate is rounded to one decimal place.

Optionally, the MCS table includes a first MCS level, a second MCS level, a third MCS level, a fourth MCS level, and a fifth MCS level that is for retransmission, where the MCS levels correspond to the modulation scheme with a modulation order of 10.

Optionally, target code rate corresponding to the first MCS level is any one of the following: 805, 806, and 805.5, and spectral efficiency corresponding to the first MCS level is any one of the following: 7.8613, 7.8711, and 7.8662.

Optionally, target code rate corresponding to the second MCS level is 853, and spectral efficiency corresponding to the second MCS level is 8.3301.

Optionally, target code rate corresponding to the third MCS level is any one of the following: 900, 901, and 900.5, and spectral efficiency corresponding to the third MCS level is any one of the following: 8.7891, 8.7988, and 8.7939.

Optionally, target code rate corresponding to the fourth MCS level is 948, and spectral efficiency corresponding to the fourth MCS level is 9.2578.

Optionally, the MCS table further includes a sixth MCS level, a seventh MCS level, an eighth MCS level, and a ninth MCS level, where the MCS levels correspond to the modulation scheme with a modulation order of 10.

Optionally, target code rate corresponding to the sixth MCS level is any one of the following: 781, 783, 781.5, and 782, and spectral efficiency corresponding to the sixth MCS level is any one of the following: 7.627, 7.6465, 7.6318, and 7.6367.

Optionally, target code rate corresponding to the seventh MCS level is any one of the following: 828, 830, and 829.5, and spectral efficiency corresponding to the seventh MCS level is any one of the following: 8.0859, 8.1055, and 8.1006.

Optionally, target code rate corresponding to the eighth MCS level is any one of the following: 876, 877, and 876.5, and spectral efficiency corresponding to the eighth MCS level is any one of the following: 8.5547, 8.5645, and 8.5596.

Optionally, target code rate corresponding to the ninth MCS level is any one of the following: 924, 925, and 924.5, and spectral efficiency corresponding to the ninth MCS level is any one of the following: 9.0234, 9.0332, and 9.0283.

Optionally, the MCS table applies to at least one of the following:

physical downlink shared channel PDSCH scheduled by physical downlink control channel PDCCH of a first downlink control information format for which cyclic redundancy check CRC is scrambled by cell radio network temporary identifier C-RNTI or configured scheduling CS-RNTI;

PDSCH scheduled by PDCCH of a second DCI format for which CRC is scrambled by C-RNTI or CS-RNTI; and physical uplink shared channel PUSCH scheduled by PDCCH of a third DCI format for which CRC is scrambled by C-RNTI or CS-RNTI, or grant-free PUSCH configured by radio resource control RRC signaling.

Optionally, the first indication information and the second indication information are transmitted via higher layer signaling, and the third indication information is transmitted via indication information in downlink control information DCI.

Optionally, the apparatus 300 for transmitting MCS indication information further includes:

a first receiving module configured to receive fourth indication information reported by the second communication device, where the fourth indication information is used to indicate whether the second communication device is capable of supporting 1024QAM.

Optionally, the fourth indication information is reported with any one of the following granularities:

per band;

per band combination; and per feature set per component-carrier FSPC.

It should be noted that the apparatus 300 for transmitting MCS indication information provided in this embodiment of this application is capable of implementing the processes implemented in the method embodiment shown in FIG. 2, with the same technical effects achieved. To avoid repetition, details are not described herein again.

In this embodiment of this application, the MCS table indicated by the first indication information includes at least an MCS level corresponding to the modulation scheme with a modulation order of 10, making it possible that the MCS level determined by the third indication information is an MCS level corresponding to the modulation scheme with a modulation order of 10. The second communication device is capable of supporting 1024QAM, and therefore can use a modulation scheme and code rate corresponding to a modulation order of 10 for a channel scheduled by the second communication device. In this way, a communication system can support higher-order modulation, ensuring high data throughputs of the communication system in high signal-to-noise ratio communication scenarios, thus improving transmission efficiency of the communication system.

Refer to FIG. 4. FIG. 4 is a flowchart of another method for transmitting MCS indication information according to an embodiment of this application. The method provided in this embodiment of this application is applied to a second communication device, and the second communication device may be a terminal.

As shown in FIG. 4, the method for transmitting MCS indication information includes the following step.

Step 401. In a case that the second communication device is capable of supporting 1024QAM, receive first indication information, second indication information, and third indication information that are transmitted by a first communication device.

The first indication information is used to indicate a modulation and coding scheme MCS table used for the second communication device to perform data transmission, and the MCS table includes an MCS level corresponding to a modulation scheme with a modulation order of 10.

The second indication information is used to indicate a CQI table used for the second communication device to perform channel quality indicator CQI feedback, and the CQI table includes a CQI level corresponding to the 1024QAM modulation scheme.

The third indication information is used for determining, according to the MCS table, an MCS level corresponding to a channel received or transmitted by the second communication device.

Optionally, the CQI table satisfies at least one of the following:

the CQI table includes CQI levels corresponding to 256QAM in a first CQI table, where the first CQI table is a CQI table including CQI levels corresponding to 256QAM;

spectral efficiencies corresponding to CQI levels are at equal intervals;

code rates corresponding to CQI levels are at equal intervals;

signal-to-noise ratios corresponding to CQI levels are at equal intervals; and the spectral efficiency is rounded to four decimal places; and the CQI table also satisfies any one of the following:

in a case that a decimal fraction is present in the code rate, the code rate is determined by rounding up to the nearest integer;

in a case that a decimal fraction is present in the code rate, the code rate is determined by rounding down to the nearest integer;

in a case that a decimal fraction is present in the code rate, the code rate is determined by rounding to the nearest integer; and in a case that a decimal fraction is present in the code rate, the code rate is rounded to one decimal place.

Optionally, the CQI table includes at least two CQI levels corresponding to the 1024QAM modulation scheme.

Optionally, the CQI table includes a first CQI level and a second CQI level that correspond to the 1024QAM modulation scheme, where code rate corresponding to the first CQI level is different from code rate corresponding to the second CQI level and spectral efficiency corresponding to the first CQI level is different from spectral efficiency corresponding to the second CQI level.

Optionally, the code rate corresponding to the first CQI level is 853, and the spectral efficiency corresponding to the first CQI level is 8.3321.

Optionally, the code rate corresponding to the second CQI level is 948, and the spectral efficiency corresponding to the second CQI level is 9.2578.

Optionally, the CQI table further includes a third CQI level and a fourth CQI level that correspond to the 1024QAM modulation scheme, where the third CQI level and the fourth CQI level are obtained based on the first CQI level and the second CQI level.

Optionally, code rate corresponding to the third CQI level is any one of the following: 805, 806, and 805.5, and spectral efficiency corresponding to the third CQI level is any one of the following: 7.8613, 7.8711, and 7.8662.

Optionally, code rate corresponding to the fourth CQI level is any one of the following: 900, 901, and 900.5, and spectral efficiency corresponding to the fourth CQI level is any one of the following: 8.7891, 8.7988, and 8.7939.

Optionally, the MCS table satisfies at least one of the following:

the MCS table includes code rates and spectral efficiencies in the CQI table;

the MCS table includes MCS levels corresponding to 256QAM in a first MCS table, where the first MCS table is an MCS table including MCS levels corresponding to 256QAM;

spectral efficiencies corresponding to MCS levels are at equal intervals;

target code rates corresponding to MCS levels are at equal intervals;

signal-to-noise ratios corresponding to MCS levels are at equal intervals; and the spectral efficiency is rounded to four decimal places; and the MCS table also satisfies any one of the following:

in a case that a decimal fraction is present in the target code rate, the target code rate is determined by rounding up to the nearest integer;

in a case that a decimal fraction is present in the target code rate, the target code rate is determined by rounding down to the nearest integer;

in a case that a decimal fraction is present in the target code rate, the target code rate is determined by rounding to the nearest integer; and in a case that a decimal fraction is present in the target code rate, the target code rate is rounded to one decimal place.

Optionally, the MCS table includes a first MCS level, a second MCS level, a third MCS level, a fourth MCS level, and a fifth MCS level that is for retransmission, where the MCS levels correspond to the modulation scheme with a modulation order of 10.

Optionally, target code rate corresponding to the first MCS level is any one of the following: 805, 806, and 805.5, and spectral efficiency corresponding to the first MCS level is any one of the following: 7.8613, 7.8711, and 7.8662.

Optionally, target code rate corresponding to the second MCS level is 853, and spectral efficiency corresponding to the second MCS level is 8.3301.

Optionally, target code rate corresponding to the third MCS level is any one of the following: 900, 901, and 900.5, and spectral efficiency corresponding to the third MCS level is any one of the following: 8.7891, 8.7988, and 8.7939.

Optionally, target code rate corresponding to the fourth MCS level is 948, and spectral efficiency corresponding to the fourth MCS level is 9.2578.

Optionally, the MCS table further includes a sixth MCS level, a seventh MCS level, an eighth MCS level, and a ninth MCS level, where the MCS levels correspond to the modulation scheme with a modulation order of 10.

Optionally, target code rate corresponding to the sixth MCS level is any one of the following: 781, 783, 781.5, and 782, and spectral efficiency corresponding to the sixth MCS level is any one of the following: 7.627, 7.6465, 7.6318, and 7.6367.

Optionally, target code rate corresponding to the seventh MCS level is any one of the following: 828, 830, and 829.5, and spectral efficiency corresponding to the seventh MCS level is any one of the following: 8.0859, 8.1055, and 8.1006.

Optionally, target code rate corresponding to the eighth MCS level is any one of the following: 876, 877, and 876.5, and spectral efficiency corresponding to the eighth MCS level is any one of the following: 8.5547, 8.5645, and 8.5596.

Optionally, target code rate corresponding to the ninth MCS level is any one of the following: 924, 925, and 924.5, and spectral efficiency corresponding to the ninth MCS level is any one of the following: 9.0234, 9.0332, and 9.0283.

Optionally, the MCS table applies to at least one of the following:

physical downlink shared channel PDSCH scheduled by physical downlink control channel PDCCH of a first downlink control information format for which cyclic redundancy check CRC is scrambled by cell radio network temporary identifier C-RNTI or configured scheduling CS-RNTI;

PDSCH scheduled by PDCCH of a second DCI format for which CRC is scrambled by C-RNTI or CS-RNTI; and physical uplink shared channel PUSCH scheduled by PDCCH of a third DCI format for which CRC is scrambled by C-RNTI or CS-RNTI, or grant-free PUSCH configured by radio resource control RRC signaling.

Optionally, the first indication information and the second indication information are transmitted via higher layer signaling, and the third indication information is transmitted via indication information in downlink control information DCI.

Optionally, the method further includes:

transmitting fourth indication information to the first communication device, where the fourth indication information is used to indicate whether the second communication device is capable of supporting 1024QAM.

Optionally, the fourth indication information is reported with any one of the following granularities:

per band;

per band combination; and per feature set per component-carrier FSPC.

It should be noted that, for specific descriptions of a specific implementation process and related technical features of the method for transmitting MCS indication information performed by the second communication device provided in this embodiment of this application, reference may be made to the descriptions of the foregoing method embodiment shown in FIG. 2. To avoid repetition, details are not described herein again.

In this embodiment of this application, the MCS table indicated by the first indication information includes at least an MCS level corresponding to the modulation scheme with a modulation order of 10, making it possible that the MCS level determined by the third indication information is an MCS level corresponding to the modulation scheme with a modulation order of 10. The second communication device is capable of supporting 1024QAM, and therefore can use a modulation scheme and code rate corresponding to a modulation order of 10 for a channel scheduled by the second communication device. In this way, a communication system can support higher-order modulation, ensuring high data throughputs of the communication system in high signal-to-noise ratio communication scenarios, thus improving transmission efficiency of the communication system.

It should be noted that the method for transmitting MCS indication information provided in the embodiments of this application may be performed by an apparatus for transmitting MCS indication information, or a control module for performing the method for transmitting MCS indication information in the apparatus for transmitting MCS indication information. In the embodiments of this application, the method for transmitting MCS indication information being performed by the apparatus for transmitting MCS indication information is used as an example to describe the apparatus for transmitting MCS indication information provided in the embodiments of this application.

Figure 5:
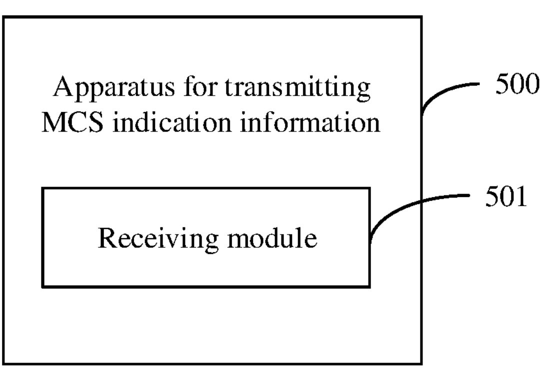
FIG. 5 is a structural diagram of another apparatus for transmitting MCS indication information according to an embodiment of this application.

Refer to FIG. 5. FIG. 5 is a structural diagram of another apparatus for transmitting MCS indication information according to an embodiment of this application. As shown in FIG. 5, the apparatus 500 for transmitting MCS indication information includes:

a receiving module 501 configured to, in a case that the apparatus for transmitting MCS indication information is capable of supporting 1024 quadrature amplitude modulation QAM, receive first indication information, second indication information, and third indication information that are transmitted by a first communication device; where the first indication information is used to indicate a modulation and coding scheme MCS table used for the apparatus for transmitting MCS indication information to perform data transmission, and the MCS table includes an MCS level corresponding to a modulation scheme with a modulation order of 10;

the second indication information is used to indicate a CQI table used for the apparatus for transmitting MCS indication information to perform channel quality indicator CQI feedback, and the CQI table includes a CQI level corresponding to the 1024QAM modulation scheme; and the third indication information is used for determining, according to the MCS table, an MCS level corresponding to a channel received or transmitted by the apparatus for transmitting MCS indication information.

Optionally, the CQI table satisfies at least one of the following:

the CQI table includes CQI levels corresponding to 256QAM in a first CQI table, where the first CQI table is a CQI table including CQI levels corresponding to 256QAM;

spectral efficiencies corresponding to CQI levels are at equal intervals;

code rates corresponding to CQI levels are at equal intervals;

signal-to-noise ratios corresponding to CQI levels are at equal intervals; and the spectral efficiency is rounded to four decimal places; and the CQI table also satisfies any one of the following:

in a case that a decimal fraction is present in the code rate, the code rate is determined by rounding up to the nearest integer;

in a case that a decimal fraction is present in the code rate, the code rate is determined by rounding down to the nearest integer;

in a case that a decimal fraction is present in the code rate, the code rate is determined by rounding to the nearest integer; and in a case that a decimal fraction is present in the code rate, the code rate is rounded to one decimal place.

Optionally, the CQI table includes at least two CQI levels corresponding to the 1024QAM modulation scheme.

Optionally, the CQI table includes a first CQI level and a second CQI level that correspond to the 1024QAM modulation scheme, where code rate corresponding to the first CQI level is different from code rate corresponding to the second CQI level and spectral efficiency corresponding to the first CQI level is different from spectral efficiency corresponding to the second CQI level.

Optionally, the code rate corresponding to the first CQI level is 853, and the spectral efficiency corresponding to the first CQI level is 8.3321.

Optionally, the code rate corresponding to the second CQI level is 948, and the spectral efficiency corresponding to the second CQI level is 9.2578.

Optionally, the CQI table further includes a third CQI level and a fourth CQI level that correspond to the 1024QAM modulation scheme, where the third CQI level and the fourth CQI level are obtained based on the first CQI level and the second CQI level.

Optionally, code rate corresponding to the third CQI level is any one of the following: 805, 806, and 805.5, and spectral efficiency corresponding to the third CQI level is any one of the following: 7.8613, 7.8711, and 7.8662.

Optionally, code rate corresponding to the fourth CQI level is any one of the following: 900, 901, and 900.5, and spectral efficiency corresponding to the fourth CQI level is any one of the following: 8.7891, 8.7988, and 8.7939.

Optionally, the MCS table satisfies at least one of the following:

the MCS table includes code rates and spectral efficiencies in the CQI table; the MCS table includes MCS levels corresponding to 256QAM in a first MCS table, where the first MCS table is an MCS table including MCS levels corresponding to 256QAM;

spectral efficiencies corresponding to MCS levels are at equal intervals;

target code rates corresponding to MCS levels are at equal intervals;

signal-to-noise ratios corresponding to MCS levels are at equal intervals; and the spectral efficiency is rounded to four decimal places; and the MCS table also satisfies any one of the following:

in a case that a decimal fraction is present in the target code rate, the target code rate is determined by rounding up to the nearest integer;

in a case that a decimal fraction is present in the target code rate, the target code rate is determined by rounding down to the nearest integer;

in a case that a decimal fraction is present in the target code rate, the target code rate is determined by rounding to the nearest integer; and in a case that a decimal fraction is present in the target code rate, the target code rate is rounded to one decimal place.

Optionally, the MCS table includes a first MCS level, a second MCS level, a third MCS level, a fourth MCS level, and a fifth MCS level that is for retransmission, where the MCS levels correspond to the modulation scheme with a modulation order of 10.

Optionally, target code rate corresponding to the first MCS level is any one of the following: 805, 806, and 805.5, and spectral efficiency corresponding to the first MCS level is any one of the following: 7.8613, 7.8711, and 7.8662.

Optionally, target code rate corresponding to the second MCS level is 853, and spectral efficiency corresponding to the second MCS level is 8.3301.

Optionally, target code rate corresponding to the third MCS level is any one of the following: 900, 901, and 900.5, and spectral efficiency corresponding to the third MCS level is any one of the following: 8.7891, 8.7988, and 8.7939.

Optionally, target code rate corresponding to the fourth MCS level is 948, and spectral efficiency corresponding to the fourth MCS level is 9.2578.

Optionally, the MCS table further includes a sixth MCS level, a seventh MCS level, an eighth MCS level, and a ninth MCS level, where the MCS levels correspond to the modulation scheme with a modulation order of 10.

Optionally, target code rate corresponding to the sixth MCS level is any one of the following: 781, 783, 781.5, and 782, and spectral efficiency corresponding to the sixth MCS level is any one of the following: 7.627, 7.6465, 7.6318, and 7.6367.

Optionally, target code rate corresponding to the seventh MCS level is any one of the following: 828, 830, and 829.5, and spectral efficiency corresponding to the seventh MCS level is any one of the following: 8.0859, 8.1055, and 8.1006.

Optionally, target code rate corresponding to the eighth MCS level is any one of the following: 876, 877, and 876.5, and spectral efficiency corresponding to the eighth MCS level is any one of the following: 8.5547, 8.5645, and 8.5596.

Optionally, target code rate corresponding to the ninth MCS level is any one of the following: 924, 925, and 924.5, and spectral efficiency corresponding to the ninth MCS level is any one of the following: 9.0234, 9.0332, and 9.0283.

Optionally, the MCS table applies to at least one of the following:

physical downlink shared channel PDSCH scheduled by physical downlink control channel PDCCH of a first downlink control information format for which cyclic redundancy check CRC is scrambled by cell radio network temporary identifier C-RNTI or configured scheduling CS-RNTI;

PDSCH scheduled by PDCCH of a second DCI format for which CRC is scrambled by C-RNTI or CS-RNTI; and physical uplink shared channel PUSCH scheduled by PDCCH of a third DCI format for which CRC is scrambled by C-RNTI or CS-RNTI, or grant-free PUSCH configured by radio resource control RRC signaling.

Optionally, the first indication information and the second indication information are transmitted via higher layer signaling, and the third indication information is transmitted via indication information in downlink control information DCI.

Optionally, the apparatus 500 for transmitting MCS indication information further includes:

a first transmitting module configured to transmit fourth indication information to the first communication device, where the fourth indication information is used to indicate whether the apparatus for transmitting MCS indication information is capable of supporting 1024QAM.

Optionally, the fourth indication information is reported with any one of the following granularities:

per band;

per band combination; and per feature set per component-carrier FSPC.

In this embodiment of this application, the apparatus 500 for transmitting MCS indication information is capable of supporting 1024QAM, and therefore can use a modulation scheme and code rate corresponding to a modulation order of 10 for a channel scheduled by the apparatus 500 for transmitting MCS indication information. In this way, a communication system can support higher-order modulation, ensuring high data throughputs of the communication system in high signal-to-noise ratio communication scenarios, thus improving transmission efficiency of the communication system.

The apparatus 500 for transmitting MCS indication information in this embodiment of this application may be a terminal, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, or a self-service machine, which is not specifically limited in this embodiment of this application.

The apparatus 500 for transmitting MCS indication information in this embodiment of this application may be an apparatus with an operating system. The operating system may be an Android operating system, an iOS operating system, or another possible operating system, which is not specifically limited in this embodiment of this application.

The apparatus 500 for transmitting MCS indication information provided in this embodiment of this application is capable of implementing the processes implemented in the method embodiment shown in FIG. 4, with the same technical effects achieved. To avoid repetition, details are not described herein again.

Figure 6:
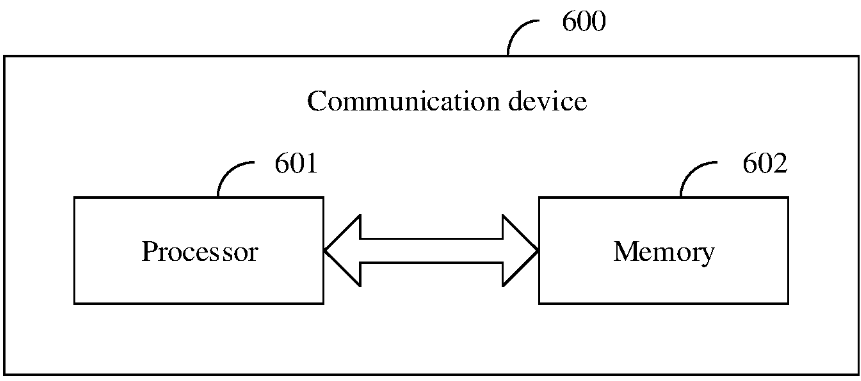
FIG. 6 is a structural diagram of a communication device according to an embodiment of this application.

Optionally, as shown in FIG. 6, an embodiment of this application further provides a communication device 600, including a processor 601, a memory 602, and a program or instructions stored in the memory 602 and capable of running on the processor 601. For example, in a case that the communication device 600 is a first communication device, when the program or instructions are executed by the processor 601, the processes of the foregoing method embodiment shown in FIG. 1 are implemented, with the same technical effects achieved. In a case that the communication device 600 is a second communication device, when the program or instructions are executed by the processor 601, the processes of the foregoing method embodiment shown in FIG. 2 are implemented, with the same technical effects achieved. To avoid repetition, details are not described herein again.

Figure 7:
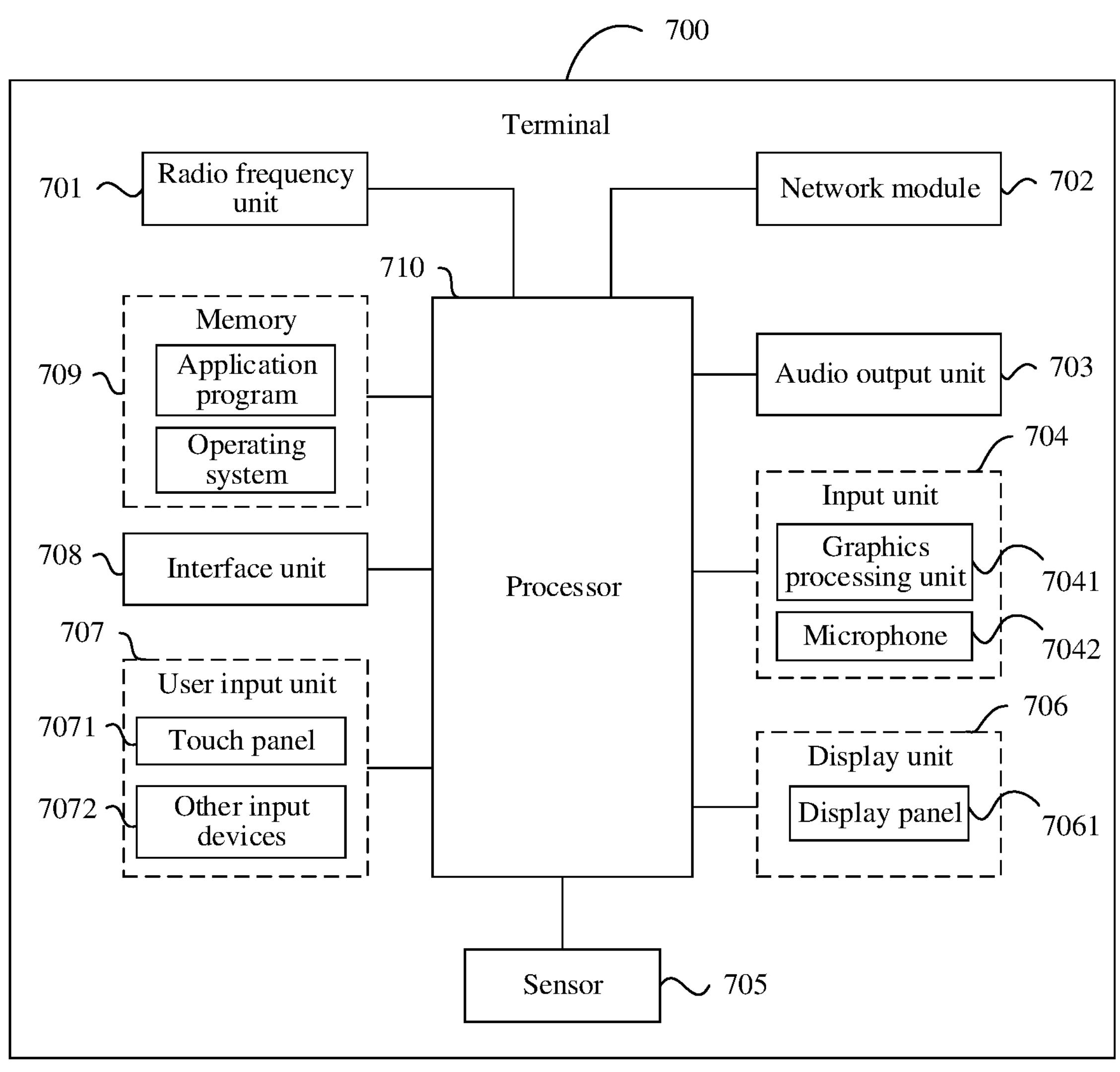
FIG. 7 is a structural diagram of a terminal according to an embodiment of this application.

FIG. 7 is a schematic diagram of a hardware structure of a terminal for implementing the embodiments of this application.

The terminal 700 includes but is not limited to at least some of these components: a radio frequency unit 701, a network module 702, an audio output unit 703, an input unit 704, a sensor 705, a display unit 706, a user input unit 707, an interface unit 708, a memory 709, a processor 710, and the like.

Persons skilled in the art can understand that the terminal 700 may further include a power supply (for example, a battery) for supplying power to the components. The power supply may be logically connected to the processor 710 via a power management system, so that functions such as charge management, discharge management, and power consumption management are implemented via the power management system. The terminal structure shown in FIG. 7 does not constitute any limitation on the terminal. The terminal may include more or fewer components than shown in the figure, or combine some of the components, or arrange the components differently. Details are not described herein again.

It should be understood that in the embodiments of this application, the input unit 704 may include a graphics processing unit (GPU) 7041 and a microphone 7042. The graphics processing unit 7041 processes image data of a static picture or a video that is obtained by an image capture apparatus (for example, a camera) in an image capture mode or a video capture mode. The display unit 706 may include a display panel 7061, and the display panel 7061 may be configured in a form of a liquid crystal display, an organic light-emitting diode display, or the like. The user input unit 707 includes a touch panel 7071 and other input devices 7072. The touch panel 7071 is also referred to as a touch-screen. The touch panel 7071 may include two parts: a touch detection apparatus and a touch controller. The other input devices 7072 may include but are not limited to a physical keyboard, a functional button (such as a volume control button or a power on/off button), a trackball, a mouse, and a joystick. Details are not described herein again.

In this embodiment of this application, the radio frequency unit 701 sends downlink data received from a network-side device to the processor 710 for processing, and in addition, sends uplink data to the network-side device. Generally, the radio frequency unit 701 includes but is not limited to an antenna, at least one amplifier, a transceiver, a coupler, a low noise amplifier, and a duplexer.

The memory 709 may be configured to store a software program or instructions and various data. The memory 709 may mainly include a program or instruction storage area and a data storage area. The program or instruction storage area may store an operating system, an application program or instructions required by at least one function (for example, a sound play function or an image play function), and the like. In addition, the memory 709 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other non-volatile solid-state storage device.

The processor 710 may include one or more processing units. Optionally, the processor 710 may integrate an application processor and a modem processor. The application processor mainly processes an operating system, a user interface, an application program or instructions, and the like. The modem processor mainly processes wireless communication, for example, a baseband processor. It can be understood that the modem processor may alternatively be not integrated into the processor 710.

In this embodiment of this application, the terminal 700 may be used as a second communication device. In a case that the terminal 700 is capable of supporting 1024QAM, the radio frequency unit 701 is configured to receive first indication information, second indication information, and third indication information that are transmitted by a first communication device.

The first indication information is used to indicate a modulation and coding scheme MCS table used for the terminal 700 to perform data transmission, and the MCS table includes an MCS level corresponding to a modulation scheme with a modulation order of 10.

The second indication information is used to indicate a CQI table used for the terminal 700 to perform channel quality indicator CQI feedback, and the CQI table includes a CQI level corresponding to the 1024QAM modulation scheme.

The third indication information is used for determining, according to the MCS table, an MCS level corresponding to a channel received or transmitted by the terminal 700.

Optionally, the CQI table satisfies at least one of the following:

the CQI table includes CQI levels corresponding to 256QAM in a first CQI table, where the first CQI table is a CQI table including CQI levels corresponding to 256QAM;

spectral efficiencies corresponding to CQI levels are at equal intervals;

code rates corresponding to CQI levels are at equal intervals;

signal-to-noise ratios corresponding to CQI levels are at equal intervals; and the spectral efficiency is rounded to four decimal places; and the CQI table also satisfies any one of the following:

in a case that a decimal fraction is present in the code rate, the code rate is determined by rounding up to the nearest integer;

in a case that a decimal fraction is present in the code rate, the code rate is determined by rounding down to the nearest integer;

in a case that a decimal fraction is present in the code rate, the code rate is determined by rounding to the nearest integer; and in a case that a decimal fraction is present in the code rate, the code rate is rounded to one decimal place.

Optionally, the CQI table includes at least two CQI levels corresponding to the 1024QAM modulation scheme.

Optionally, the CQI table includes a first CQI level and a second CQI level that correspond to the 1024QAM modulation scheme, where code rate corresponding to the first CQI level is different from code rate corresponding to the second CQI level and spectral efficiency corresponding to the first CQI level is different from spectral efficiency corresponding to the second CQI level.

Optionally, the code rate corresponding to the first CQI level is 853, and the spectral efficiency corresponding to the first CQI level is 8.3321.

Optionally, the code rate corresponding to the second CQI level is 948, and the spectral efficiency corresponding to the second CQI level is 9.2578.

Optionally, the CQI table further includes a third CQI level and a fourth CQI level that correspond to the 1024QAM modulation scheme, where the third CQI level and the fourth CQI level are obtained based on the first CQI level and the second CQI level.

Optionally, code rate corresponding to the third CQI level is any one of the following: 805, 806, and 805.5, and spectral efficiency corresponding to the third CQI level is any one of the following: 7.8613, 7.8711, and 7.8662.

Optionally, code rate corresponding to the fourth CQI level is any one of the following: 900, 901, and 900.5, and spectral efficiency corresponding to the fourth CQI level is any one of the following: 8.7891, 8.7988, and 8.7939.

Optionally, the MCS table satisfies at least one of the following:

the MCS table includes code rates and spectral efficiencies in the CQI table; the MCS table includes MCS levels corresponding to 256QAM in a first MCS table, where the first MCS table is an MCS table including MCS levels corresponding to 256QAM;

spectral efficiencies corresponding to MCS levels are at equal intervals;

target code rates corresponding to MCS levels are at equal intervals;

signal-to-noise ratios corresponding to MCS levels are at equal intervals; and the spectral efficiency is rounded to four decimal places; and the MCS table also satisfies any one of the following:

in a case that a decimal fraction is present in the target code rate, the target code rate is determined by rounding up to the nearest integer;

in a case that a decimal fraction is present in the target code rate, the target code rate is determined by rounding down to the nearest integer;

in a case that a decimal fraction is present in the target code rate, the target code rate is determined by rounding to the nearest integer; and in a case that a decimal fraction is present in the target code rate, the target code rate is rounded to one decimal place.

Optionally, the MCS table includes a first MCS level, a second MCS level, a third MCS level, a fourth MCS level, and a fifth MCS level that is for retransmission, where the MCS levels correspond to the modulation scheme with a modulation order of 10.

Optionally, target code rate corresponding to the first MCS level is any one of the following: 805, 806, and 805.5, and spectral efficiency corresponding to the first MCS level is any one of the following: 7.8613, 7.8711, and 7.8662.

Optionally, target code rate corresponding to the second MCS level is 853, and spectral efficiency corresponding to the second MCS level is 8.3301.

Optionally, target code rate corresponding to the third MCS level is any one of the following: 900, 901, and 900.5, and spectral efficiency corresponding to the third MCS level is any one of the following: 8.7891, 8.7988, and 8.7939.

Optionally, target code rate corresponding to the fourth MCS level is 948, and spectral efficiency corresponding to the fourth MCS level is 9.2578.

Optionally, the MCS table further includes a sixth MCS level, a seventh MCS level, an eighth MCS level, and a ninth MCS level, where the MCS levels correspond to the modulation scheme with a modulation order of 10.

Optionally, target code rate corresponding to the sixth MCS level is any one of the following: 781, 783, 781.5, and 782, and spectral efficiency corresponding to the sixth MCS level is any one of the following: 7.627, 7.6465, 7.6318, and 7.6367.

Optionally, target code rate corresponding to the seventh MCS level is any one of the following: 828, 830, and 829.5, and spectral efficiency corresponding to the seventh MCS level is any one of the following: 8.0859, 8.1055, and 8.1006.

Optionally, target code rate corresponding to the eighth MCS level is any one of the following: 876, 877, and 876.5, and spectral efficiency corresponding to the eighth MCS level is any one of the following: 8.5547, 8.5645, and 8.5596.

Optionally, target code rate corresponding to the ninth MCS level is any one of the following: 924, 925, and 924.5, and spectral efficiency corresponding to the ninth MCS level is any one of the following: 9.0234, 9.0332, and 9.0283.

Optionally, the MCS table applies to at least one of the following:

physical downlink shared channel PDSCH scheduled by physical downlink control channel PDCCH of a first downlink control information format for which cyclic redundancy check CRC is scrambled by cell radio network temporary identifier C-RNTI or configured scheduling CS-RNTI;

PDSCH scheduled by PDCCH of a second DCI format for which CRC is scrambled by C-RNTI or CS-RNTI; and physical uplink shared channel PUSCH scheduled by PDCCH of a third DCI format for which CRC is scrambled by C-RNTI or CS-RNTI, or grant-free PUSCH configured by radio resource control RRC signaling.

Optionally, the first indication information and the second indication information are transmitted via higher layer signaling, and the third indication information is transmitted via indication information in downlink control information DCI.

Optionally, the radio frequency unit 701 is further configured to transmit fourth indication information to the first communication device, where the fourth indication information is used to indicate whether the apparatus for transmitting MCS indication information is capable of supporting 1024QAM.

Optionally, the fourth indication information is reported with any one of the following granularities:

per band;

per band combination; and per feature set per component-carrier FSPC.

In this embodiment of this application, the terminal 700 is capable of supporting 1024QAM, and therefore can use a modulation scheme and code rate corresponding to a modulation order of 10 for a channel scheduled by the terminal 700. In this way, a communication system can support higher-order modulation, ensuring high data throughputs of the communication system in high signal-to-noise ratio communication scenarios, thus improving transmission efficiency of the communication system.

Figure 8:
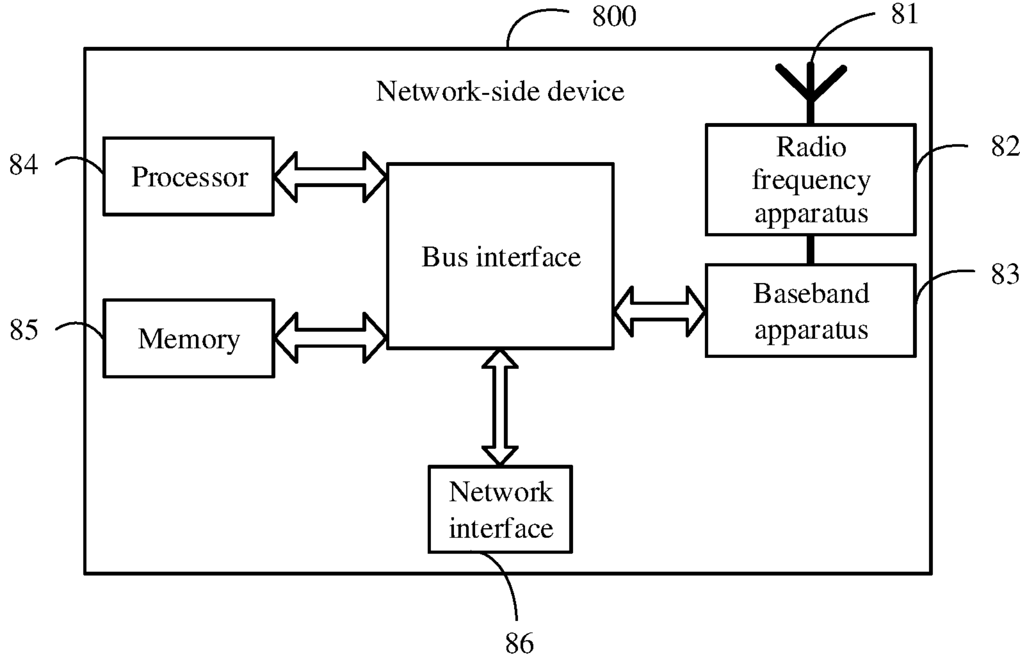
FIG. 8 is a structural diagram of a network-side device according to an embodiment of this application.

Specifically, an embodiment of this application further provides a network-side device. As shown in FIG. 8, the network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes information to be sent, and sends the information to the radio frequency apparatus 82; and the radio frequency apparatus 82 processes the received information and then sends the information by using the antenna 81.

The aforementioned band processing apparatus may be located in the baseband apparatus 83. The method performed by the network-side device in the foregoing embodiment may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84 which is connected to the memory 85 to invoke a program in the memory 85 to perform the operations of the network-side device shown in the foregoing method embodiment.

The baseband apparatus 83 may further include a network interface 86 configured to exchange information with the radio frequency apparatus 82, where the interface is, for example, a common public radio interface (CPRI for short).

Specifically, the network-side device in this embodiment of this application further includes instructions or a program stored in the memory 85 and capable of running on the processor 84. The processor 84 invokes the instructions or program in the memory 85 to perform the method performed by the modules shown in FIG. 3, with the same technical effects achieved. To avoid repetition, details are not described herein.

An embodiment of this application further provides a readable storage medium, where the readable storage medium stores a program or instructions, and when the program or instructions are executed by a processor, the processes of the foregoing method embodiment shown in FIG. 2 are implemented, or the processes of the foregoing method embodiment shown in FIG. 4 are implemented, with the same technical effects achieved. To avoid repetition, details are not described herein again.

The processor is a processor in the terminal in the foregoing embodiment. The readable storage medium includes a computer-readable storage medium such as a computer read-only memory (ROM), a random access memory (RAM), a magnetic disk, or an optical disc.

An embodiment of this application further provides a chip. The chip includes a processor and a communication interface. The communication interface is coupled to the processor, and the processor is configured to run a program or instructions of a network-side device to implement the processes of the foregoing method embodiment shown in FIG. 2 or the processes of the foregoing method embodiment shown in FIG. 4, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. In the absence of more restrictions, an element preceded by the statement "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, and may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such understanding, the technical solutions of this application essentially or the part thereof that contributes to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network-side device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms which do not depart from the essence of this application and the protection scope of the claims, and all such forms shall fall within the protection scope of this application.

What is claimed is:

1. A method for transmitting modulation and coding scheme (MCS) indication information, performed by a first communication device, comprising:

in a case that a second communication device is capable of supporting 1024 quadrature amplitude modulation (QAM), transmitting first indication information, second indication information, and third indication information to the second communication device; wherein the first indication information is used to indicate a modulation and coding scheme (MCS) table used for the second communication device to perform data transmission, and the MCS table comprises an MCS level corresponding to a modulation scheme with a modulation order of 10;

the second indication information is used to indicate a channel quality indicator (CQI) table used for the second communication device to perform CQI feedback, and the CQI table comprises a CQI level corresponding to the 1024QAM modulation scheme; and the third indication information is used for determining, according to the MCS table, an MCS level corresponding to a channel received by the second communication device;

wherein the MCS table comprises a first MCS level, a second MCS level, a third MCS level, a fourth MCS level, and a fifth MCS level that is for retransmission, wherein the MCS levels correspond to the modulation scheme with a modulation order of 10;

wherein a target code rate corresponding to the first MCS level is 805.5, and spectral efficiency corresponding to the first MCS level is 7.8662;

wherein a target code rate corresponding to the second MCS level is 853, and spectral efficiency corresponding to the second MCS level is 8.3301;

wherein a target code rate corresponding to the third MCS level is 900.5, and spectral efficiency corresponding to the third MCS level is 8.7939;

and wherein a target code rate corresponding to the fourth MCS level is 948, and spectral efficiency corresponding to the fourth MCS level is 9.2578.

2. The method according to claim 1, wherein the MCS table satisfies at least one of the following:

the MCS table comprises code rates and spectral efficiencies in the CQI table;

the MCS table comprises MCS levels corresponding to 256QAM in a first MCS table, wherein the first MCS table is an MCS table comprising MCS levels corresponding to 256QAM;

spectral efficiencies corresponding to MCS levels are at equal intervals;

target code rates corresponding to MCS levels are at equal intervals;

signal-to-noise ratios corresponding to MCS levels are at equal intervals; or the spectral efficiency is rounded to four decimal places.

3. A method for transmitting-receiving modulation and coding scheme (MCS) indication information, performed by a second communication device, comprising:

in a case that the second communication device is capable of supporting 1024 quadrature amplitude modulation (QAM), receiving first indication information, second indication information, and third indication information that are transmitted by a first communication device; wherein the first indication information is used to indicate a modulation and coding scheme (MCS) table used for the second communication device to perform data transmission, and the MCS table comprises an MCS level corresponding to a modulation scheme with a modulation order of 10;

the second indication information is used to indicate a CQI table used for the second communication device to perform channel quality indicator CQI feedback, and the CQI table comprises a CQI level corresponding to the 1024QAM modulation scheme; and the third indication information is used for determining, according to the MCS table, an MCS level corresponding to a channel received by the second communication device;

wherein the MCS table comprises a first MCS level, a second MCS level, a third MCS level, a fourth MCS level, and a fifth MCS level that is for retransmission, wherein the MCS levels correspond to the modulation scheme with a modulation order of 10;

wherein the target code rate corresponding to the first MCS level, multiplied by 1024, is 805.5, and spectral efficiency corresponding to the first MCS level is 7.8662;

wherein the target code rate corresponding to the second MCS level, multiplied by 1024, is 853, and spectral efficiency corresponding to the second MCS level is 8.3301;

wherein the target code rate corresponding to the third MCS level, multiplied by 1024, is 900.5, and spectral efficiency corresponding to the third MCS level is 8.7939; and wherein the target code rate corresponding to the fourth MCS level, multiplied by 1024, is 948, and spectral efficiency corresponding to the fourth MCS level is 9.2578.

4. The method according to claim 3, wherein the MCS table satisfies at least one of the following:

the MCS table comprises code rates and spectral efficiencies in the CQI table;

the MCS table comprises MCS levels corresponding to 256QAM in a first MCS table, wherein the first MCS table is an MCS table comprising MCS levels corresponding to 256QAM;

spectral efficiencies corresponding to MCS levels are at equal intervals;

target code rates corresponding to MCS levels are at equal intervals;

signal-to-noise ratios corresponding to MCS levels are at equal intervals; or the spectral efficiency is rounded to four decimal places.

5. A communication device, comprising a processor, a memory, and a program or instructions stored in the memory and capable of running on the processor, wherein when the program or instructions are executed by the processor, the communication device implements:

in a case that a second communication device is capable of supporting 1024 quadrature amplitude modulation (QAM), transmitting first indication information, second indication information, and third indication information to the second communication device; wherein the first indication information is used to indicate a modulation and coding scheme (MCS) table used for the second communication device to perform data transmission, and the MCS table comprises an MCS level corresponding to a modulation scheme with a modulation order of 10;

the second indication information is used to indicate a channel quality indicator (CQI) table used for the second communication device to perform CQI feedback, and the CQI table comprises a CQI level corresponding to the 1024QAM modulation scheme; and the third indication information is used for determining, according to the MCS table, an MCS level corresponding to a channel received by the second communication device;

wherein the MCS table comprises a first MCS level, a second MCS level, a third MCS level, a fourth MCS level, and a fifth MCS level that is for retransmission, wherein the MCS levels correspond to the modulation scheme with a modulation order of 10;

wherein a target code rate corresponding to the first MCS level is 805.5, and spectral efficiency corresponding to the first MCS level is 7.8662;

wherein a target code rate corresponding to the second MCS level is 853, and spectral efficiency corresponding to the second MCS level is 8.3301;

wherein a target code rate corresponding to the third MCS level is 900.5, and spectral efficiency corresponding to the third MCS level is 8.7939;

and wherein a target code rate corresponding to the fourth MCS level is 948, and spectral efficiency corresponding to the fourth MCS level is 9.2578.

6. The method according to claim 1, wherein the MCS table applies to:

physical downlink shared channel (PDSCH) scheduled by physical downlink control channel (PDCCH) of a first downlink control information format for which cyclic redundancy check (CRC) is scrambled by cell radio network temporary identifier (C-RNTI) or configured scheduling CS-RNTI.

7. The method according to claim 6, wherein the first downlink control information format is a DCI format1_1.

8. The method according to claim 1, wherein the MCS table applies to:

PDSCH scheduled by PDCCH of a second DCI format for which CRC is scrambled by C-RNTI or CS-RNTI.

9. The method according to claim 1, wherein the first indication information and the second indication information are transmitted via higher layer signaling, and the third indication information is transmitted via indication information in downlink control information (DCI).

10. The method according to claim 1, wherein the method further comprises:

receiving fourth indication information reported by the second communication device, wherein the fourth indication information is used to indicate whether the second communication device is capable of supporting 1024QAM.

11. The method according to claim 3, wherein the MCS table applies to:

physical downlink shared channel (PDSCH) scheduled by physical downlink control channel (PDCCH) of a first downlink control information format for which cyclic redundancy check (CRC) is scrambled by cell radio network temporary identifier (C-RNTI) or configured scheduling CS-RNTI.

12. The method according to claim 11, wherein the first downlink control information format is a DCI format1_1.

13. The method according to claim 3, wherein the MCS table applies to:

PDSCH scheduled by PDCCH of a second DCI format for which CRC is scrambled by C-RNTI or CS-RNTI.

14. The method according to claim 3, wherein the first indication information and the second indication information are transmitted via higher layer signaling, and the third indication information is transmitted via indication information in downlink control information DCI.

15. The method according to claim 3, wherein the method further comprises:

transmitting fourth indication information reported by the second communication device, wherein the fourth indication information is used to indicate whether the second communication device is capable of supporting 1024QAM.

16. The method according to claim 15, wherein the fourth indication is reported with any one of the following granularities:

per band;

per band combination; and per feature set per component-carrier (FSPC).

17. The communication device according to claim 5, wherein the MCS table satisfies at least one of the following:

the MCS table comprises code rates and spectral efficiencies in the CQI table;

the MCS table comprises MCS levels corresponding to 256QAM in a first MCS table, wherein the first MCS table is an MCS table comprising MCS levels corresponding to 256QAM;

spectral efficiencies corresponding to MCS levels are at equal intervals;

target code rates corresponding to MCS levels are at equal intervals;

signal-to-noise ratios corresponding to MCS levels are at equal intervals; or the spectral efficiency is rounded to four decimal places.

18. The communication device according to claim 5, wherein the MCS table applies to:

physical downlink shared channel (PDSCH) scheduled by physical downlink control channel (PDCCH) of a first downlink control information format for which cyclic redundancy check (CRC) is scrambled by cell radio network temporary identifier (C-RNTI) or configured scheduling CS-RNTI.

19. The communication device according to claim 18, wherein the first downlink control information format is a DCI format1_1.

20. The communication device according to claim 5, wherein the first indication information and the second indication information are transmitted via higher layer signaling, and the third indication information is transmitted via indication information in downlink control information (DCI).

* * * * *